United States Patent
Yu

(10) Patent No.: US 9,097,832 B2
(45) Date of Patent: Aug. 4, 2015

(54) LIQUID CRYSTAL DISPLAY (LCD) SYSTEM AND METHOD

(75) Inventor: Xiao Lin Yu, Fairfax, VA (US)

(73) Assignee: Xiao Lin Yu, Fairfax, VA (US)

( * ) Notice: Subject to any disclaimer, the term of this patent is extended or adjusted under 35 U.S.C. 154(b) by 1097 days.

(21) Appl. No.: 13/016,976

(22) Filed: Jan. 29, 2011

(65) Prior Publication Data

US 2011/0261276 A1    Oct. 27, 2011

Related U.S. Application Data

(63) Continuation-in-part of application No. 12/768,638, filed on Apr. 27, 2010.

(51) Int. Cl.
| | | |
|---|---|---|
| G02F 1/1333 | (2006.01) | |
| G02F 1/1335 | (2006.01) | |
| F21V 8/00 | (2006.01) | |
| G09G 3/34 | (2006.01) | |

(52) U.S. Cl.
CPC ............ G02B 6/0081 (2013.01); G02B 6/0028 (2013.01); G09G 3/342 (2013.01); *G02B 6/0043* (2013.01); *G02B 6/0075* (2013.01); *G02F 1/133308* (2013.01); *G02F 1/133603* (2013.01); *G02F 1/133608* (2013.01); *G09G 2300/0456* (2013.01)

(58) Field of Classification Search
CPC combination set(s) only.
See application file for complete search history.

(56) References Cited

U.S. PATENT DOCUMENTS

| | | | |
|---|---|---|---|
| 6,407,785 B1* | 6/2002 | Yamazaki | 349/113 |
| 7,750,993 B2* | 7/2010 | Kim et al. | 349/68 |
| 7,903,198 B2* | 3/2011 | Abe et al. | 349/65 |
| 7,940,353 B2* | 5/2011 | Tanaka | 349/65 |
| 2006/0209229 A1* | 9/2006 | Tai et al. | 349/63 |
| 2007/0171333 A1* | 7/2007 | Suzuki | 349/74 |
| 2008/0198298 A1* | 8/2008 | Jeong et al. | 349/65 |
| 2009/0046479 A1* | 2/2009 | Bierhuizen et al. | 362/612 |
| 2010/0073791 A1 | 3/2010 | Mahowald | |
| 2010/0171900 A1* | 7/2010 | Lee | 349/58 |

* cited by examiner

*Primary Examiner* — Wen-Ying P Chen
(74) *Attorney, Agent, or Firm* — Anova Law Group, PLLC

(57) ABSTRACT

A liquid crystal display (LCD) system is provided. The LCD system includes a light source and a self-contained display unit including at least a LCD panel and a light guide plate coupled together, wherein the light guide plate is configured to guide light from the light source to the LCD panel as backlight and to structurally support the LCD panel. Further, a plurality of pre-made hollow spaces are contained in the display unit configured to host components of the LCD system. The LCD system also includes a controller contained in the plurality of pre-made hollow spaces and coupled to the LCD panel to control the LCD panel such that the light passing through the light guide plate is used as backlight for operation of the LCD panel.

18 Claims, 36 Drawing Sheets

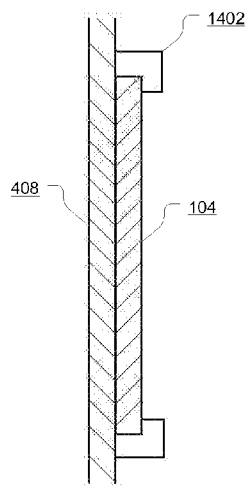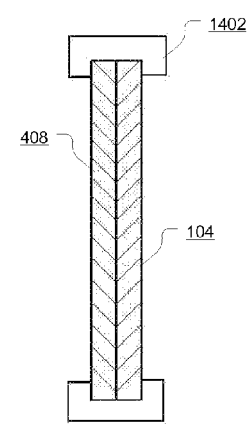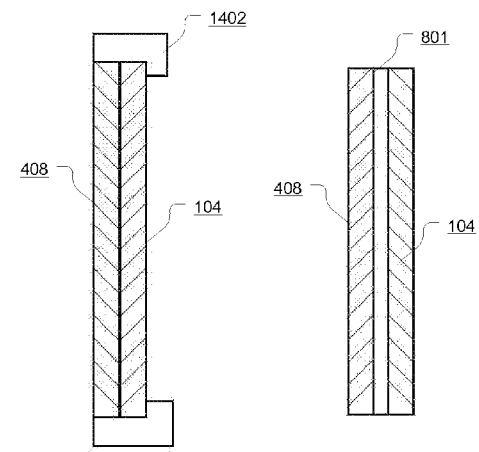
FIG. 14A   FIG. 14B   FIG. 14C   FIG. 14D
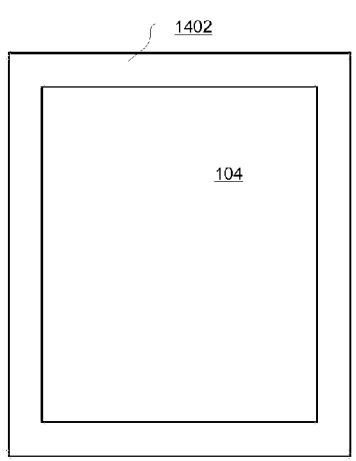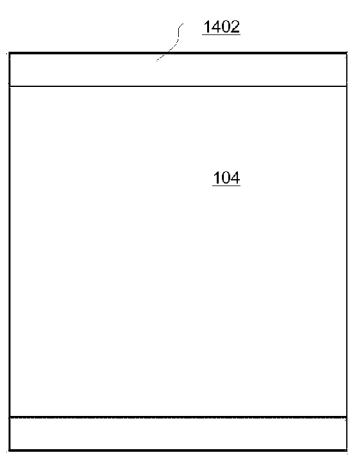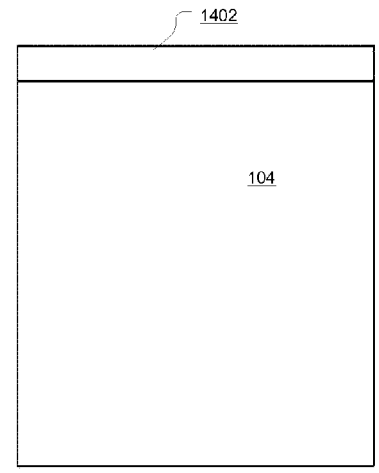
FIG. 15A   FIG. 15B   FIG. 15C

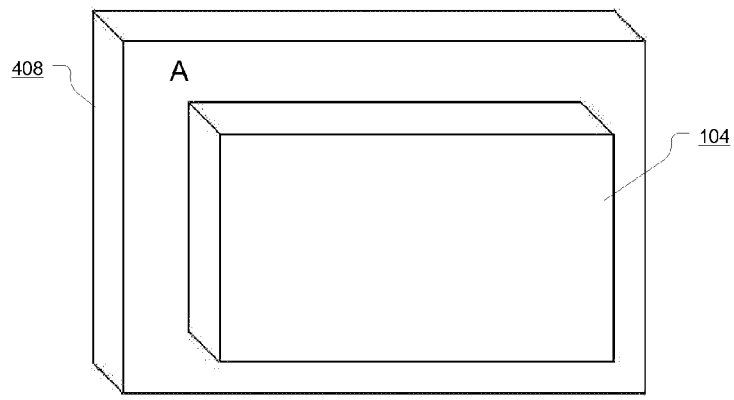
FIG. 16A
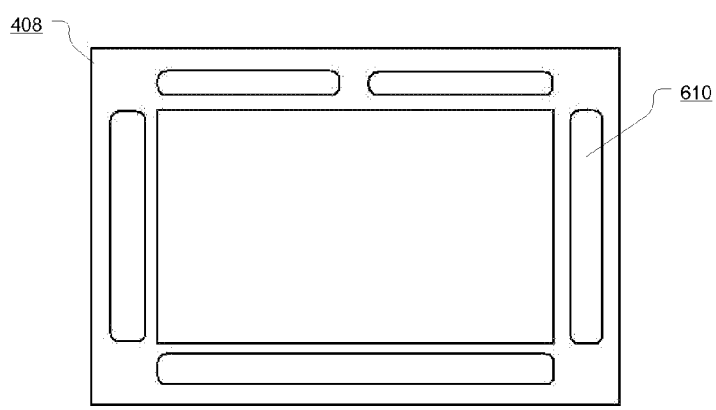
FIG. 16B
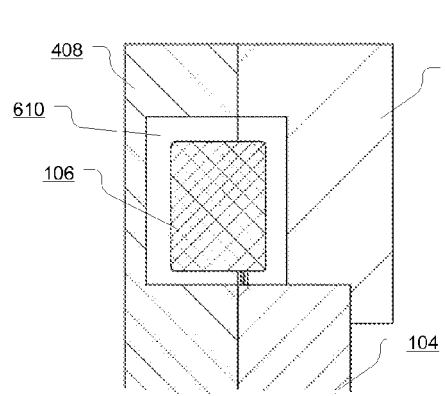 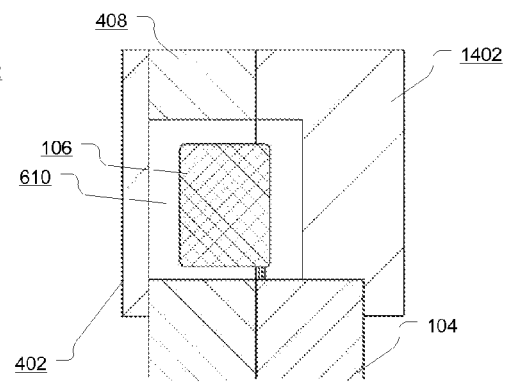
FIG. 16C   FIG. 16D

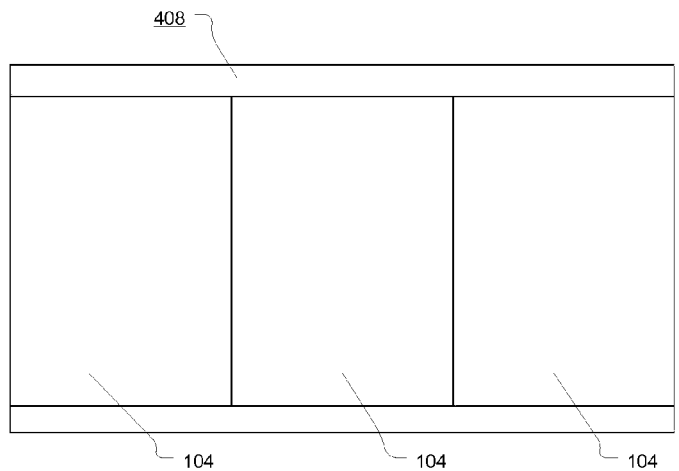
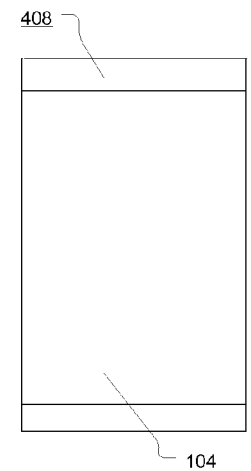
FIG. 19A          FIG. 19B
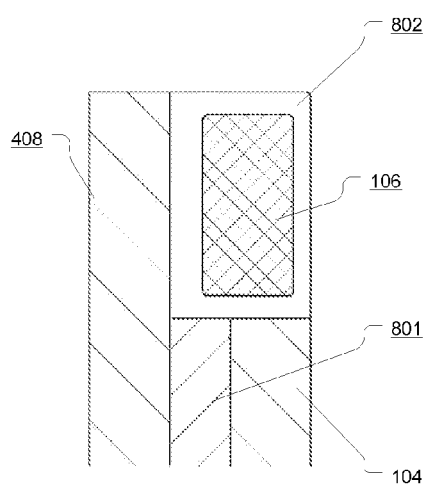
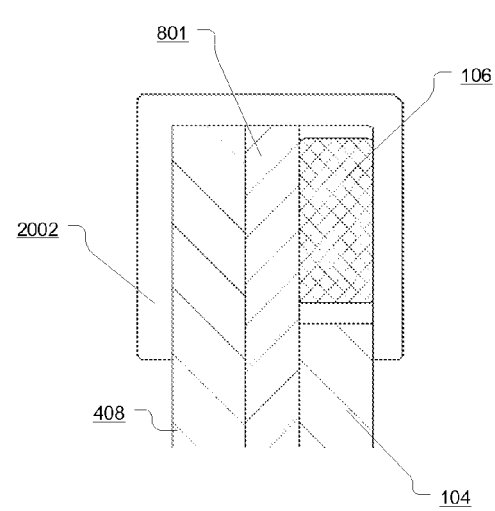
FIG. 20A          FIG. 20B

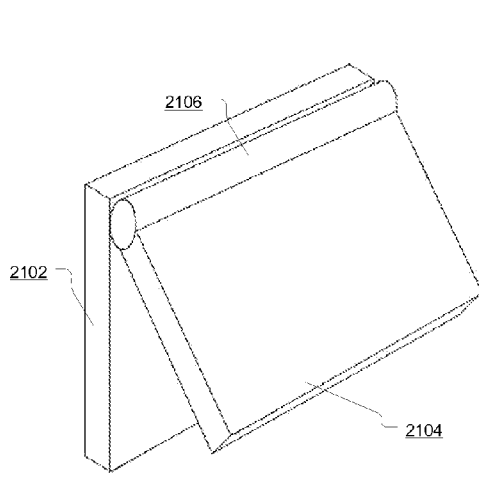
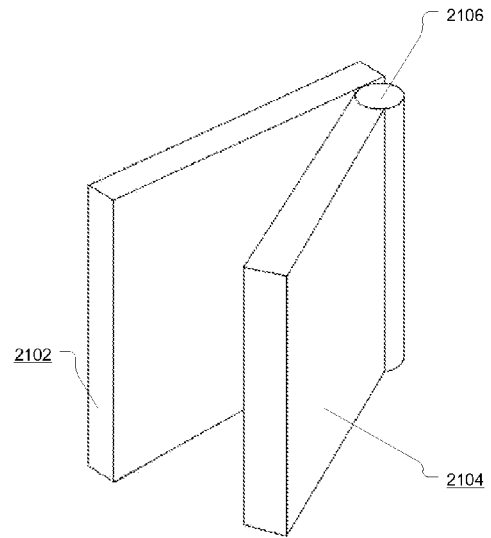
FIG. 21A  FIG. 21B
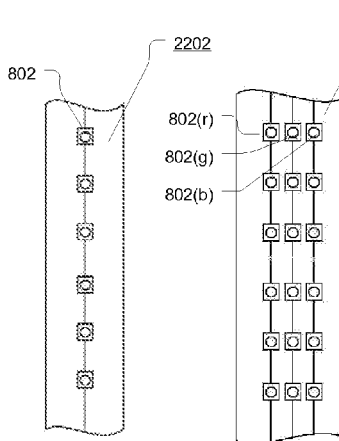
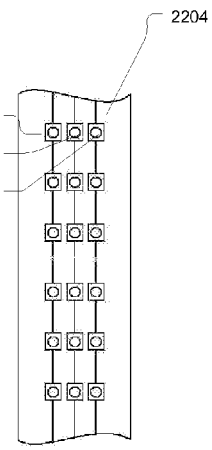
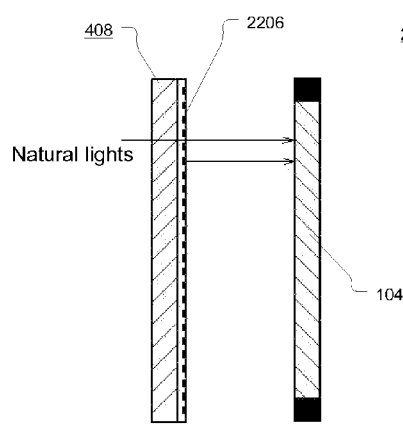
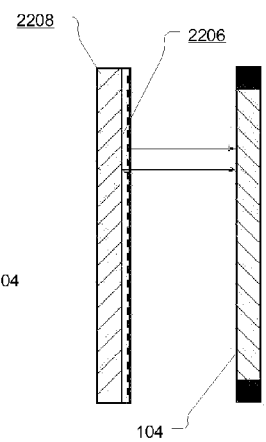
FIG. 22A  FIG. 22B  FIG. 22C  FIG. 22D

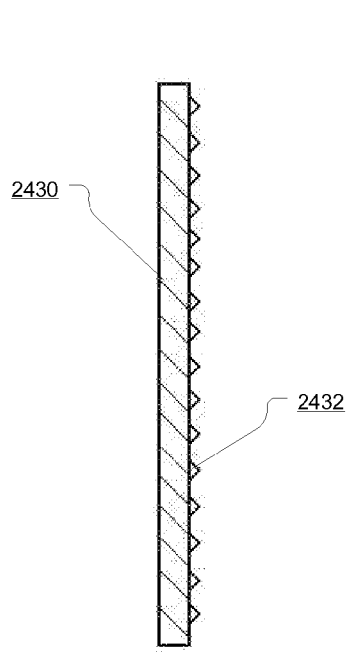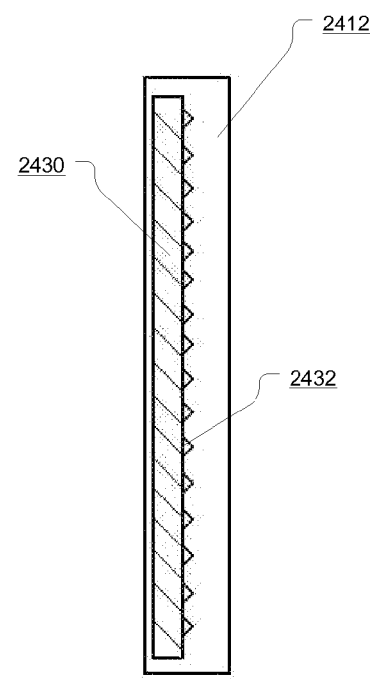
FIG. 25A          FIG. 25B
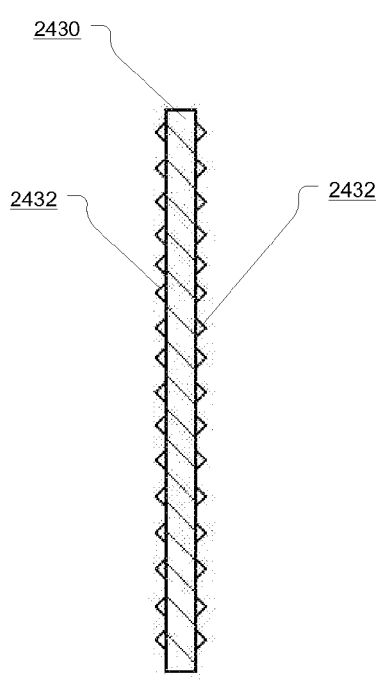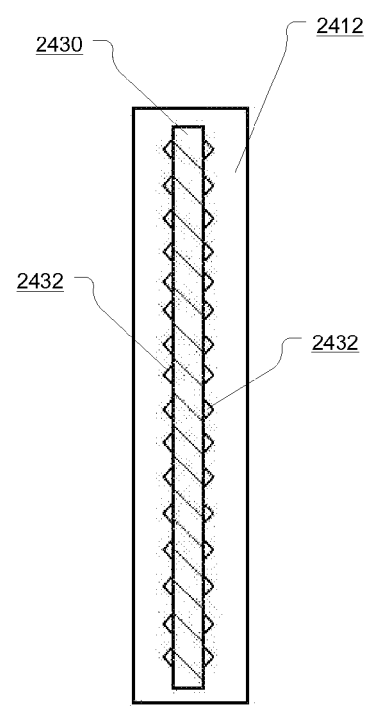
FIG. 25C          FIG. 25D

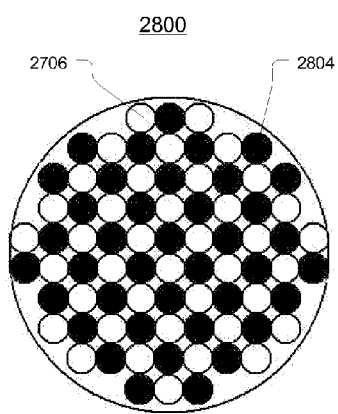
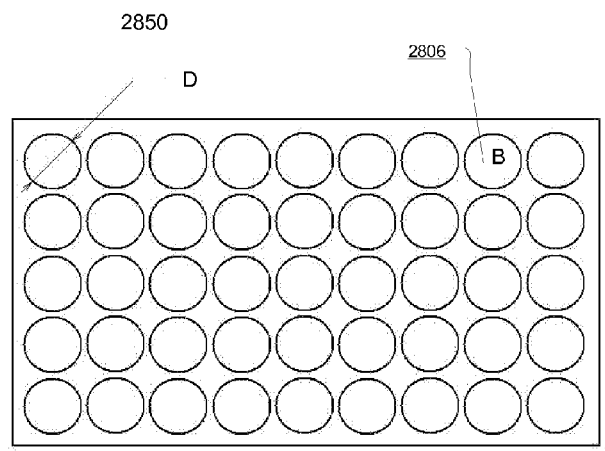
FIG. 28A　　　　　　　　　　　FIG. 28B
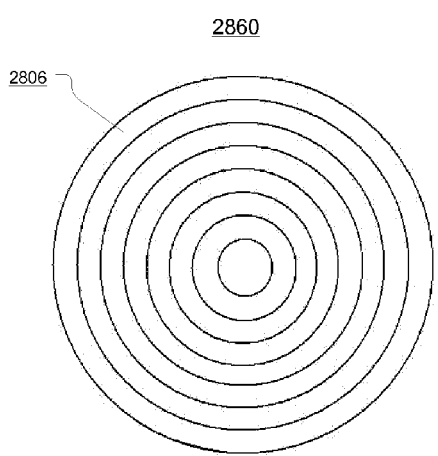
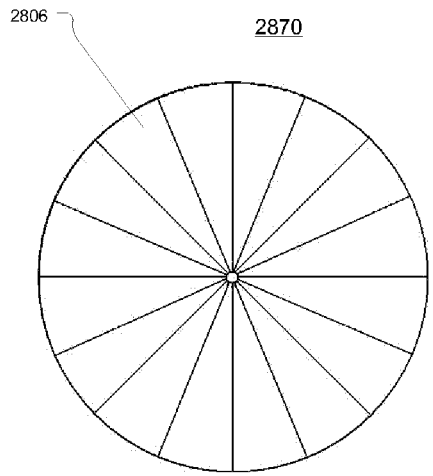
FIG. 28C　　　　　　　　　　　FIG. 28D

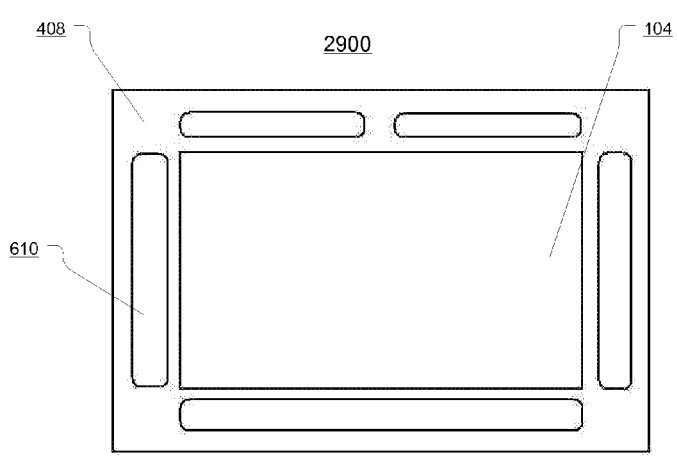
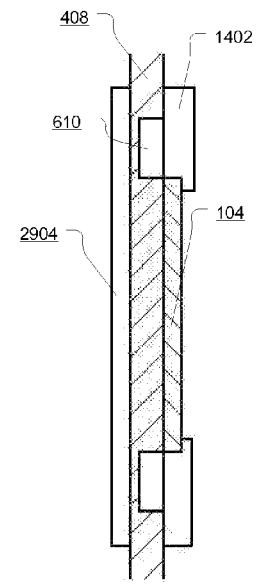
FIG. 29A
FIG. 29B
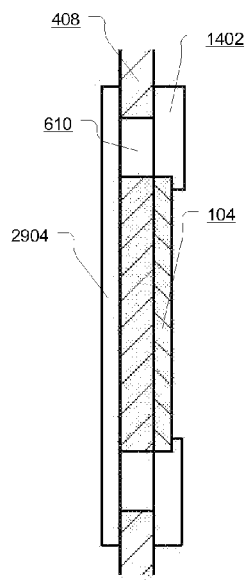
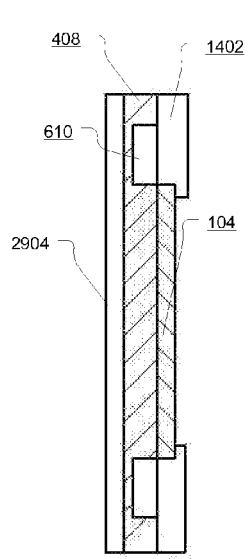
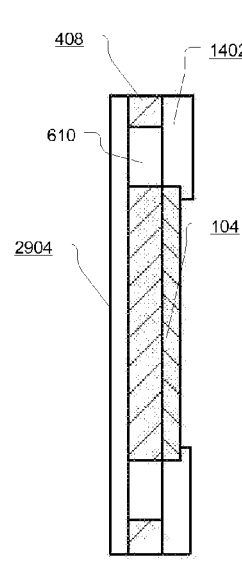
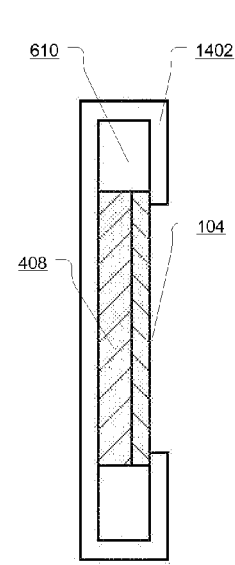
FIG. 29C   FIG. 29D   FIG. 29E   FIG. 29F

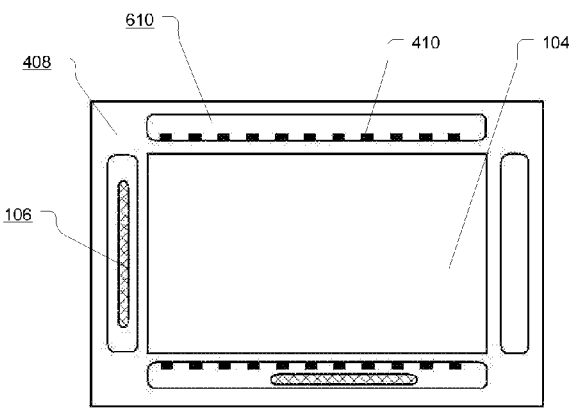
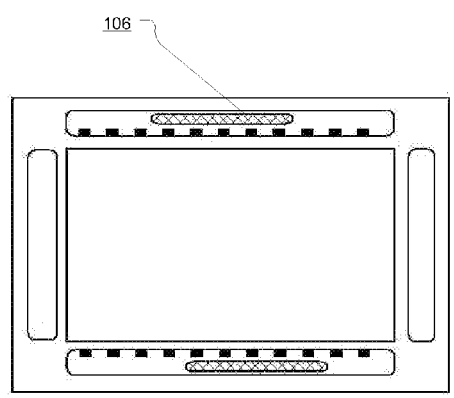
FIG. 30A  FIG. 30B
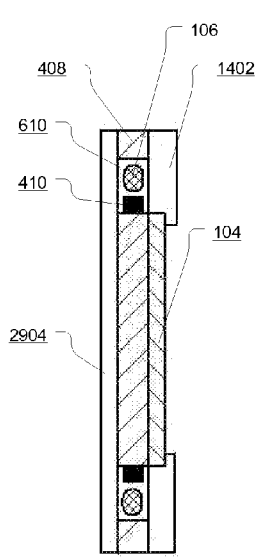
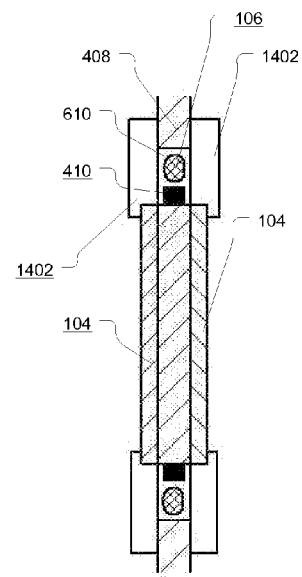
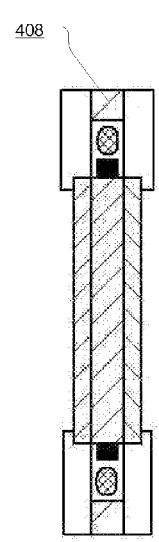
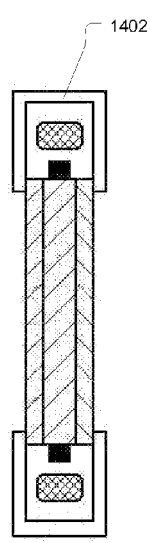
FIG. 30C  FIG. 30D  FIG. 30E  FIG. 30F

LIQUID CRYSTAL DISPLAY (LCD) SYSTEM AND METHOD

CROSS-REFERENCES TO RELATED APPLICATIONS

This is a continuation-in-part (CIP) application of U.S. patent application Ser. No. 12/768,638, filed on Apr. 27, 2010, the entire contents of which are incorporated herein by reference.

FIELD OF THE INVENTION

This application generally relates to liquid crystal display (LCD) technology and, more particularly, to LCD systems with improved backlight mechanisms.

BACKGROUND

A TV receiver or a computer monitor often employs a liquid crystal display (LCD) or a plasma display panel (PDP) to replace a cathode ray tube (CRT). Recently, the rapid advancement of the semiconductor techniques makes LCD panels, particularly color LCD panels more popular and less expensive.

An LCD panel is a passive display device in that the LCD panel displays light information signal that has been light-converted but does not itself emit light. Thus, an LCD device needs a light source such as a backlight unit. A conventional LCD device commonly uses a backlight unit employing a plurality of lamps to emit enough light to illuminate the LCD panel. However, a plurality of lamps not only consume a large amount of energy, but also limit the size, weight, and operational environment of the LCD device.

Some LCD devices use external light to improve the backlight unit. For example, published US patent application no. 2010/0073791 to Mahowald (the '791 application) discloses an apparatus for harnessing external light to illuminate a display screen of an electronic device. However, the '791 application explicitly addresses the problem where the external or ambient light is brighter than the illumination of the display screen by collecting external light to help illuminate the display screen. Therefore, the '791 application may not be able to overcome the shortcomings of the conventional LCD devices.

Further, demands for large and super-large display screens are increasing. Currently, many limitations exist in manufacturing, structural design, size, and transportation of those large and super-large display screens, and, thus, make producing and installing those large and super-large display screens costly. Conventional LCD display devices also integrate backlight sources with LCD screen, and may substantially increase the manufacturing cost of backlight sources when the size of the display screens increases. Cost of other components of the display screen may also increase.

Therefore, it would be beneficial to provide systems and methods employing natural light or external light as the light source to illuminate an LCD panel. The disclosed methods and systems are directed to solve one or more problems set forth above and other problems.

BRIEF SUMMARY OF THE DISCLOSURE

One aspect of the present disclosure includes a liquid crystal display (LCD) system. The LCD system includes a light source and a self-contained display unit including at least a LCD panel and a light guide plate coupled together, wherein the light guide plate is configured to guide light from the light source to the LCD panel as backlight and to structurally support the LCD panel. Further, a plurality of pre-made hollow spaces are contained in the display unit configured to host components of the LCD system. The LCD system also includes a controller contained in the plurality of pre-made hollow spaces and coupled to the LCD panel to control the LCD panel such that the light passing through the light guide plate is used as backlight for operation of the LCD panel.

Another aspect of the present disclosure includes a method for an LCD system in an electronic window application. The method includes obtaining video images to be displayed on the LCD system to simulate a window. The method also includes composing a plurality of window data items based on the video images, and each window data item includes date information, time information, weather information, scene information, video information, and audio information. Further, the method includes determining a playback mode and controlling operation of the LCD system to play the widow data items according to the playback mode to generate window sceneries.

Another aspect of the present disclosure includes an LCD system based signaling system. The signaling system includes one or more LCD panels configured to receive natural light, and a plurality of convex lenses coupled to the LCD panels to concentrate the received natural light. The signaling system also includes a plurality of optic fibers configured to receive the concentrated natural light at one end and to couple with a signaling panel at the other end such that the received light from the optic fiber is used to provide various signals on the signaling panel. Further, the signaling panel is turned on and off by controlling the LCD panels to allow or not allow the natural light passing through the LCD panels.

Another aspect of the present disclosure includes an LCD system, the LCD system includes a display system and a separate backlight system. The display system is without backlighting and capable of being coupled to a plurality of backlight sources. The separate backlight system is coupled to the display system to provide at least one of the plurality of backlight sources. Further, the display system includes at least a LCD panel, a light guide plate coupled to the LCD panel, and a control circuitry; the light guide plate is configured to guide light from the at least one of the plurality of backlight sources to the LCD panel as backlight and to structurally support the LCD panel; and the LCD panel is coupled to the light guide plate by a glue layer.

Other aspects of the present disclosure can be understood by those skilled in the art in light of the description, the claims, and the drawings of the present disclosure.

BRIEF DESCRIPTION OF THE DRAWINGS

FIGS. 14A-14D illustrate exemplary installations of LCD panels consistent with the disclosed embodiments;

FIGS. 15A-15C illustrate exemplary configurations of a front frame consistent with the disclosed embodiments;

FIGS. 16A-16D illustrate exemplary configurations of a light guide plate consistent with the disclosed embodiments;

FIGS. 19A-19B illustrate exemplary installations of display screens consistent with the disclosed embodiments;

FIGS. 20A-20B illustrate exemplary installations of control circuitry consistent with the disclosed embodiments;

FIGS. 21A-21B illustrate exemplary large display screen structures consistent with the disclosed embodiments;

FIGS. 22A-22D illustrate exemplary LED belts and configurations consistent with the disclosed embodiments;

FIGS. 25A-25D illustrate exemplary light guide plate structures consistent with the disclosed embodiments;

FIGS. 28A-28D illustrate exemplary signaling panel structures consistent with the disclosed embodiments;

FIGS. 29A-29F illustrate exemplary integrated display systems consistent with the disclosed embodiments;

FIGS. 30A-30F illustrate other exemplary integrated display systems consistent with the disclosed embodiments;

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
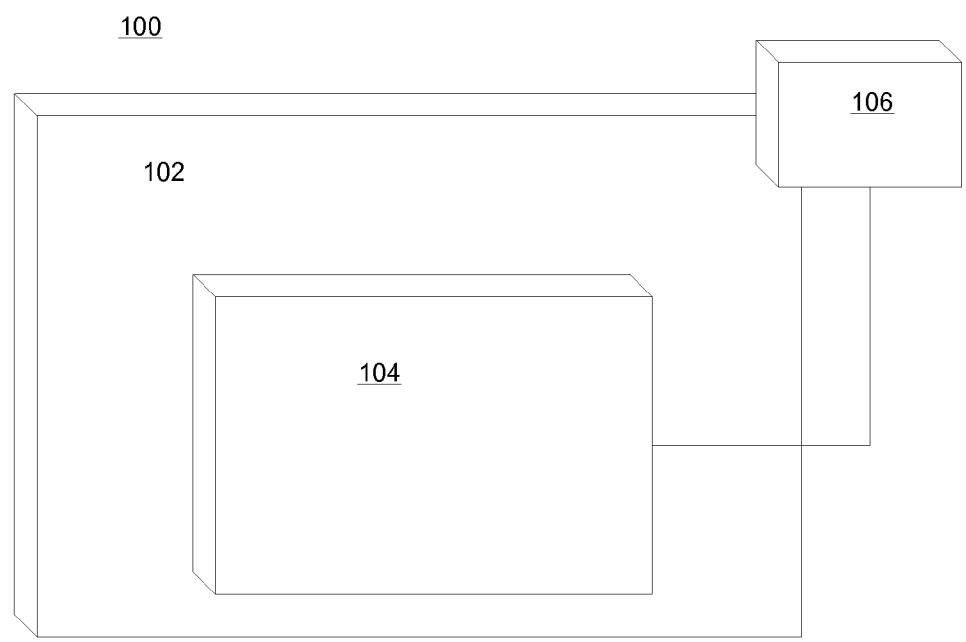
FIG. 1 illustrates an exemplary LCD system consistent with the disclosed embodiments.

FIG. 1 illustrates an exemplary LCD system 100. As shown in FIG. 1, LCD system 100 includes a window glass 102, an LCD panel 104, and a controller 106. Other components may also be included. Although LCD system 100 as illustrated is based on LCD technology, any appropriate technology may be used and LCD system 100 is not limited to LCD technology.

Window glass 102 may refer to any appropriate type of light-passable plate, such as a glass plate for windows, walls, or doors, which allows natural light to pass through. For the purpose of illustration, windows may be used to associate with window glass 102. However, any type of appropriate structures may be used to associate with window glass 102, such as doors, walls, boards, or the like. Window glass 102 may be made of any appropriate transparent material or translucent material with certain degree of transparency to let certain amount of natural light pass through.

LCD panel 104 may include any appropriate type of LCD screen or any other type of passive display screen for displaying images, texts, videos, etc. Although only one LCD panel is shown, LCD panel 104 may include one or more LCD panels. LCD panel 104 is coupled to or mounted on window glass 102 to allow natural light pass LCD panel 104 through window glass 102 and to save space between LCD panel 104 and window glass 102. That is, window glass 102 not only passes light to illuminate LCD panel 104, but also structurally supports LCD panel 104. Various mechanisms may be used to couple LCD panel 104 to window glass 102. For example, LCD panel 104 may be coupled to window glass 102 using glue (not shown) or using mechanical fasten means such as screws (not shown). For the purpose of illustration, window glass 102 coupled with LCD panel 104 and other related components, if any, may be referred as an LCD display.

Figure 2:
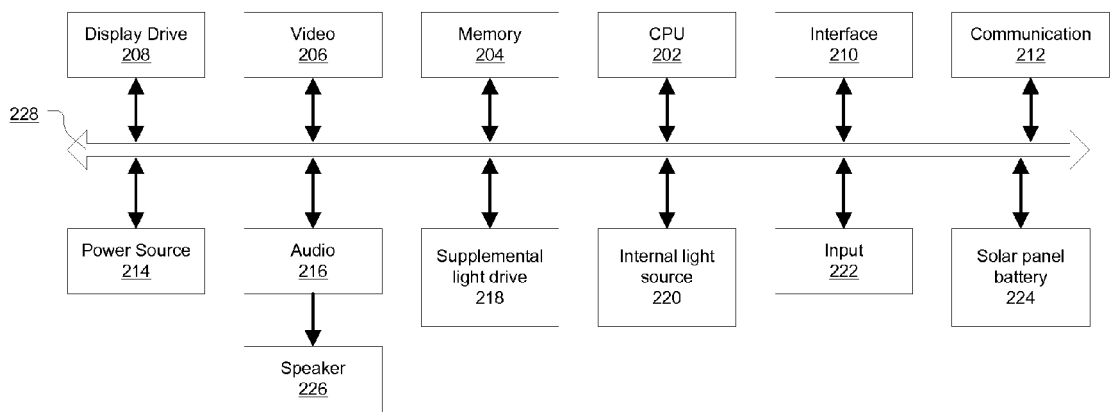
FIG. 2 illustrates an exemplary controller of an LCD system consistent with the disclosed embodiments.

Further, LCD panel 104 is couple to controller 106. Although controller 106 is illustrated as a separate unit, certain part(s) or all of controller 106 may be integrated into LCD panel 104. Controller 106 may include any appropriate device or system for controlling LCD panel 104 and providing audio, video, and picture sources to LCD panel 104. FIG. 2 shows an exemplary block diagram of controller 106.

As shown in FIG. 2, controller 106 may include a CPU 202, a memory module 204, a video unit 206, a display drive 208, an interface unit 210, a communication unit 212, a power source 214, an audio unit 216, a supplemental light drive 218, an internal light source 220, an input unit 222, a solar panel battery 224, and speaker 226. All these devices/units are listed for illustration purposes, certain devices/units may be omitted and other devices may be added without departing from the principles of the present invention. Further, a bus 228 is included to allow various devices/units coupled with CPU 202 for operation.

CPU 202 may include any appropriate type of general purpose microprocessor, digital signal processor or microcontroller. Memory module 204 may include one or more memory devices including, but not limited to, a ROM, a flash memory, a dynamic RAM, and a static RAM. Further, memory module 204 may include other storage devices such as hard disks, storage cards and disks. For example, memory module 204 may also include universal serial bus (USB) storage cards, secure digital (SD) storage cards, digital versatile disc (DVD) drive, etc. Memory module 204 may be configured to store information used by CPU 202. Memory module 204 may also be configured to store audio, video, and text information to be displayed, and driver software and upgrade software for storage devices.

Video unit 206 may include any appropriate circuitry to provide video or image information to be displayed by LCD panel 104, and display drive 208 may include circuitry to drive or control LCD panel 104. Interface unit 210 may be used for CPU 202 to interface with other devices or components, either internal or external. Further, communication unit 212 may include any appropriate type of network adaptor capable of communicating with other computer systems based on one or more communication protocols. For example, communication unit 212 may include a wireless communication unit communicating with LCD panel wirelessly.

Power source 214 may include any appropriate direct current (DC) or alternating current (AC) power supply for providing power to controller 106. Audio unit 216 may be provided to decode or generate audio information and to input the audio information to speaker 226. Further, supplemental light drive 218 may include any appropriate circuitry to drive light sources/units used for supplementing natural light, and internal light source 220 may be optionally provided to include any appropriate light devices, such as light emitting diodes (LEDs), to illuminate LCD panel 104.

Input unit 222 may include any appropriate type of input device, such as a key board, a touch screen or touch pad, a mouse, or a remote control, to allow a user of LCD system 100 to interact with LCD system 100. Solar panel battery 224 may include any appropriate type of battery based on solar energy. Further, bus 228 may include one or more control and/or data buses to couple various devices/units together for operation.

Figure 3A:
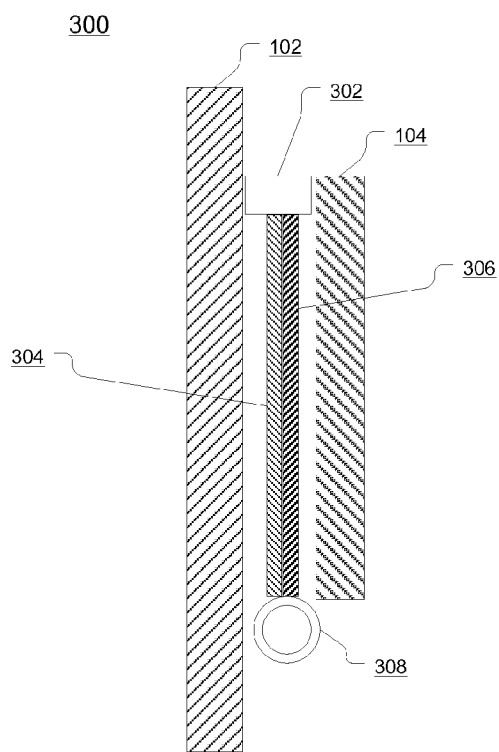
FIG. 3A illustrates an exemplary configuration of an LCD display consistent with the disclosed embodiments.

Returning to FIG. 1, natural light passing through window glass 102 illuminates LCD panel, i.e., acts as backlight for LCD panel 104. Using natural light as the backlight may not only save a significant amount of energy and space, but also improve image quality displayed on LCD panel 104 in that natural light may have a wider spectrum than artificial light such that images on an LCD panel with natural light backlight may appear more colorful and realistic looking. In operation, various configurations or setups for coupling window glass 102 and LCD panel 104 may be provided for using natural light as the backlight for LCD panel 104. FIG. 3A illustrates an exemplary configuration of window glass 102 and LCD panel 104 forming an LCD display 300.

As shown in FIG. 3A, window glass 102 and LCD panel 104 are coupled by using coupler 302. As explained previously, coupler 302 may be any appropriate chemical means or mechanical means or both to couple LCD panel 104 to window glass 102 closely. Although coupler 302 is shown on one side, coupler 302 may include any appropriate shape or structure, such as a continuous frame, or a discontinuous support structure.

Further, concentrator film 304 and diffuser film 306 are coupled or placed between window glass 102 and LCD panel 104. Concentrator film 304 may include any appropriate type of film or thin material for concentrating natural light; and diffuser film 306 may include any appropriate type of film or thin material for diffusing natural light passing through to evenly illuminate LCD panel 104.

Although concentrator film 304 and diffuser film 306 are both used for illustration purposes, either concentrator film 304 or diffuser film 306 alone may be used in certain embodiments. Further, other materials providing similar functionalities may also be used instead of concentrator film 304 and diffuser film 306. For example, a diffuser glass plate may be used in place of concentrator film 304 and diffuser film 306, and the diffuser glass plate may be closely coupled between window glass 102 and LCD panel 104. In certain other embodiments, LCD panel 104 may be directly coupled to window glass 102 without concentrator film 304 and/or diffuser film 306.

A wheeling device 308 may be provided to deploy and retract concentrator film 304 and diffuser film 306. Wheeling device 308 may include any type of device that, manually or automatically under the control of controller 106, extends concentrator film 304 and diffuser film 306 to be positioned between window glass 102 and LCD panel 104 and to cover LCD panel 104. Wheeling device 308 may also retrieve concentrator film 304 and diffuser film 306 such that natural light passing through window glass 102 illuminates LCD panel 104 without passing through concentrator film 304 and diffuser film 306.

Figure 3B:
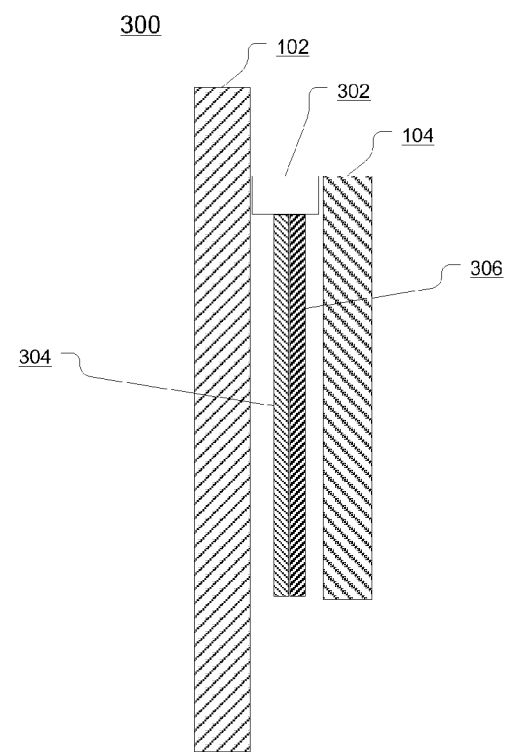
FIG. 3B illustrates another exemplary configuration of the LCD display consistent with the disclosed embodiments.

FIG. 3B illustrates another exemplary configuration of LCD display 300. As shown in FIG. 3B, LCD display 300 includes the same components as in FIG. 3A, except wheeling device 308. Thus, concentrator film 304 and diffuser film 306 are positioned between window glass 102 and LCD panel 104 without the capability of being retrieved to allow natural light pass through window glass 102 to directly illuminate LCD panel 104.

Figure 3C:
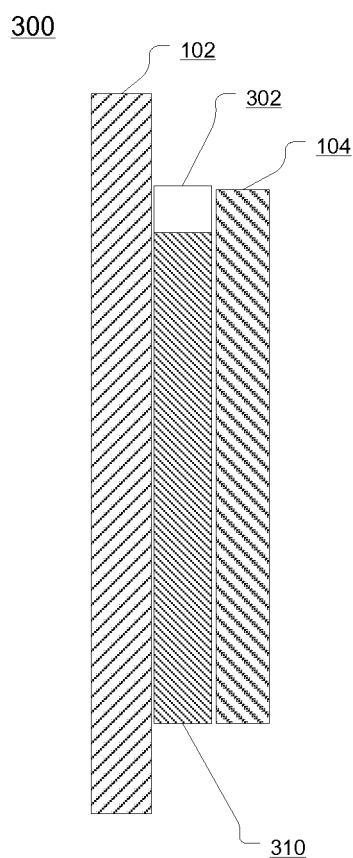
FIG. 3C illustrates another exemplary configuration of the LCD display consistent with the disclosed embodiments.

FIG. 3C illustrates another exemplary configuration of LCD display 300. As shown in FIG. 3C, LCD display 300 includes window glass 102, LCD panel 104, and coupler 302. Further, LCD display 300 may include a transparency control unit 310. Transparency control unit 310 may include any appropriate type of structure, such as a film or a glass plate, whose transparency may be controlled by electricity current or voltage applied to the structure. By changing the applied current or voltage, the transparency of transparency control unit 310 may be controlled. Further, transparency control unit 310 may also diffuse natural light passing through window glass 102 to evenly illuminate LCD panel 104.

Figure 4A:
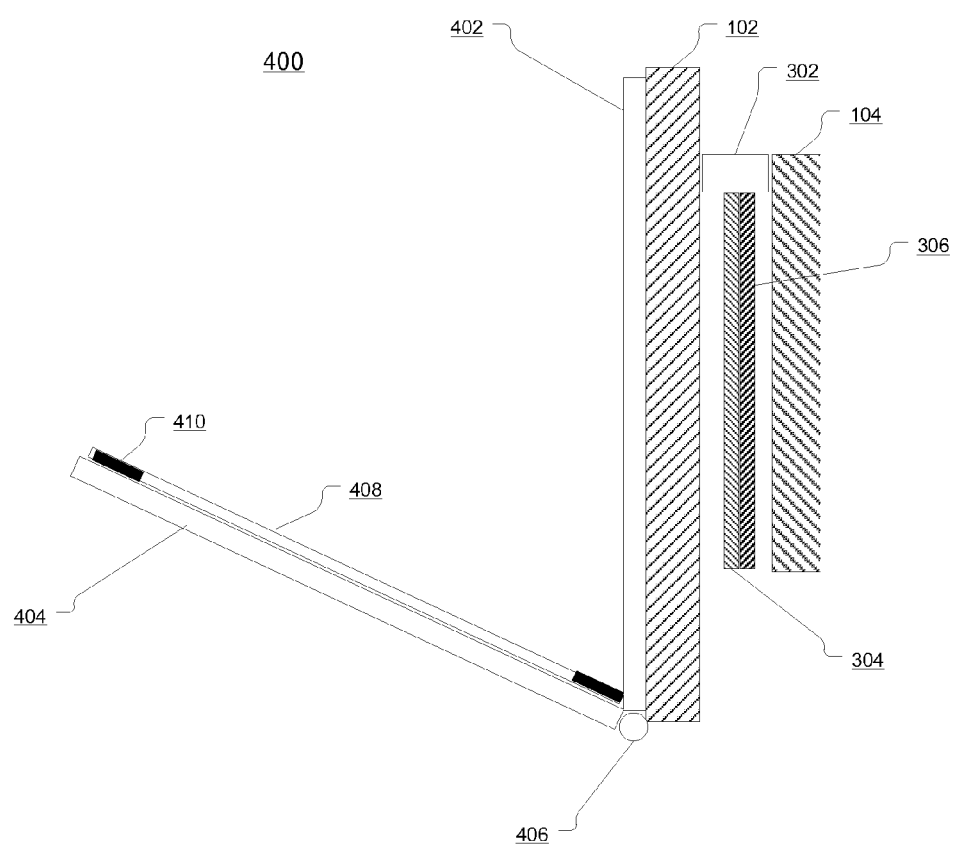
FIG. 4A illustrates an exemplary configuration of an LCD display consistent with the disclosed embodiments.

FIG. 4A illustrates an exemplary configuration of window glass 102 and LCD panel 104 forming an LCD display 400. As shown in FIG. 4A, glass 102 and LCD panel 104 are coupled by using coupler 302, and concentrator film 304 and diffuser film 306 are placed between window glass 102 and LCD panel 104. Further, a frame 402 is coupled to window glass 102 on the side opposite to LCD panel 104. A reflector 404 is coupled to frame 402 via coupler 406 such that reflector 404 may be rotated to and from frame 402.

Reflector 404 may include a reflecting surface such that reflector 404 may reflect natural light to window glass 102 and to increase amount of natural light passing through window glass 102. Coupler 406 may include any appropriate structure such that reflector 404 may rotate manually or automatically along an axis of coupler 406 with respect to frame 402, such as a motor or a hinge. For example, reflector 404 may rotate to a closed position, i.e., reflector 404 fits into frame 402, or at any angle with respect to frame 402 such that the light reflected to window glass 102 is suitable for properly illuminating LCD panel 104. Reflector 404 may be used to improve or supplement natural light passing through window glass 102.

Further, reflector 404 may include a light-guide 408 and a light source 410. Light-guide 408 may include any appropriate material to guide light emitted by light source 410 to pass through window glass 102. Light source 410 may include one or more lamps or LEDs to supplement or replace natural light. For example, if natural light or natural light improved by light reflected by reflector 404 is sufficient to illuminate LCD panel 104, light source 410 might remain turned off. However, if the natural light is not sufficient, light source 410 may emit light to supplement or replace the natural light to illuminate LCD panel 104. When reflector 404 is rotated to the closed position, no natural light passes through window glass 102 and light source 410 becomes the only light source to illuminate LCD panel 104.

In certain embodiments, window glass 102 may be omitted. LCD panel 104 may be coupled to frame 402 via coupler 302. That is, LCD panel 104 coupled with frame 402 may act as a window or the like, when mounted on window frames, walls, doors, and similar structures.

Figure 4B:
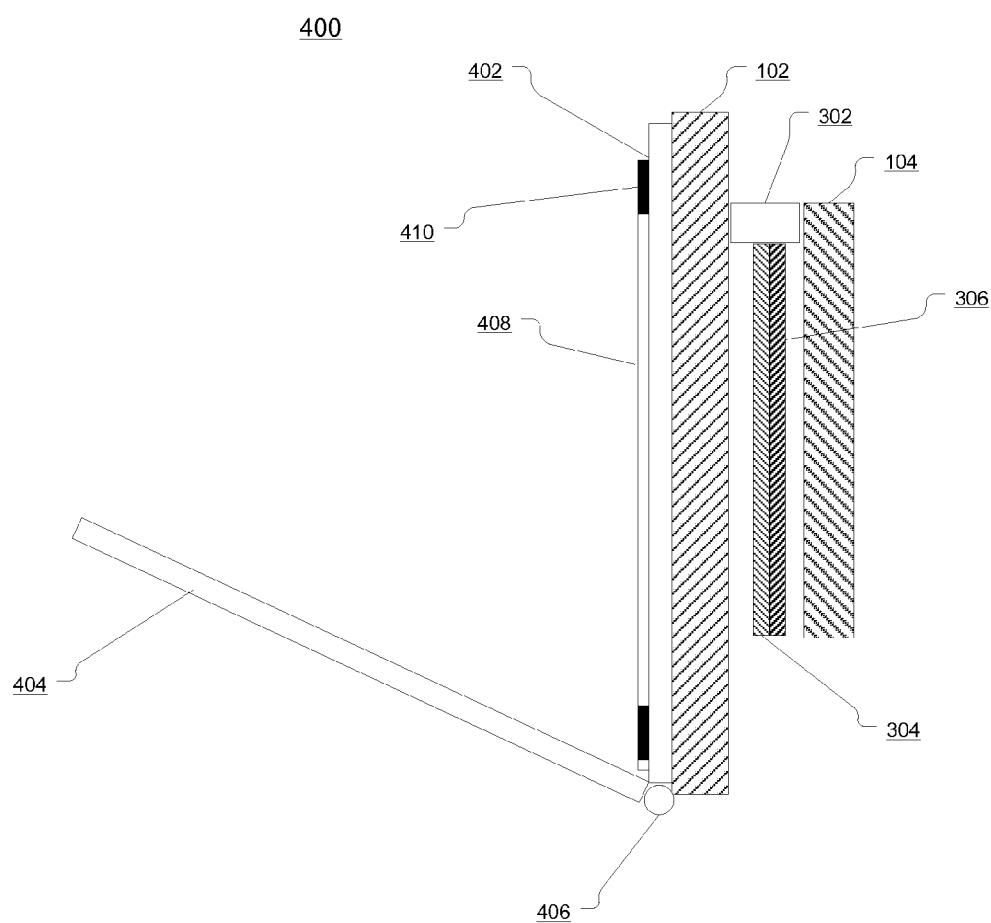
FIG. 4B illustrates another exemplary configuration of the LCD display consistent with the disclosed embodiments.

FIG. 4B illustrates another exemplary configuration of LCD display 400. As shown in FIG. 4B, the LCD display includes the same components as in FIG. 4A, except that light-guide 408 and light source 410 are coupled to frame 402. Light emitted from light source 410, via light-guide 408, may directly pass through window glass 102 in straight angle (e.g., about 90 degrees) when supplementing the natural light. Further, in certain embodiments, window glass 102 may coincide with light-guide 408. In certain other embodiments, light-guide 408 and/or window glass 102 may contain a matte surface such that concentrator film 304 and/or diffuser film 306 may be omitted.

Figure 5:
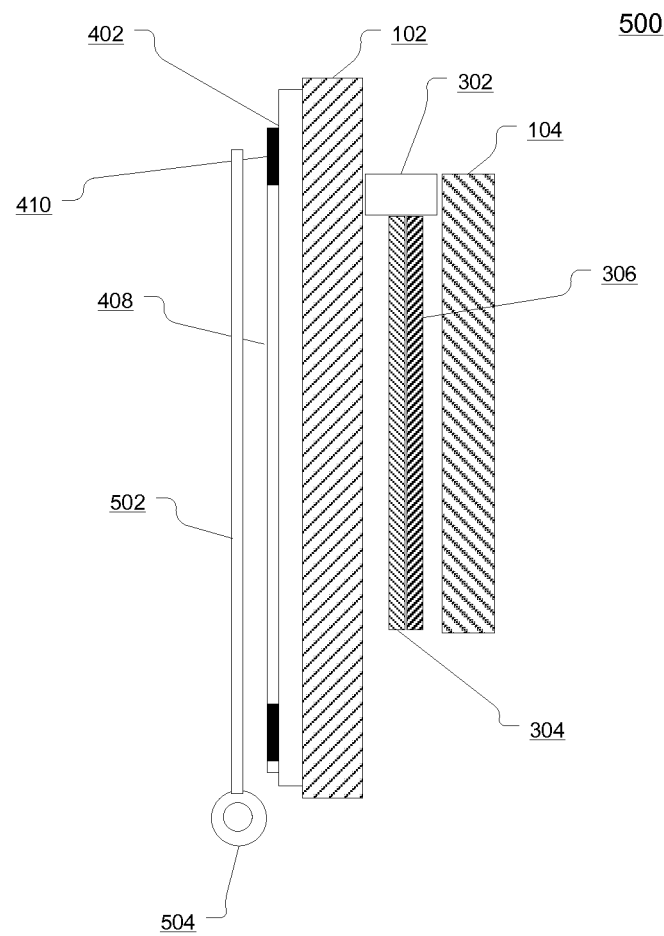
FIG. 5 illustrates an exemplary configuration of an LCD display consistent with the disclosed embodiments.

FIG. 5 illustrates an exemplary configuration of window glass 102 and LCD panel 104 forming an LCD display 500. As shown in FIG. 5, glass 102 and LCD panel 104 are coupled by using coupler 302, and concentrator film 304 and diffuser film 306 are placed between window glass 102 and LCD panel 104. A frame 402 is coupled to window glass 102 on the side opposite to LCD panel 104.

A light-guide 408 and a light source 410 are coupled to frame 402. As previously explained, light-guide 408 guides light emitted by light source 410 to pass through window glass 102. Further, a reflecting film 502 may be positioned to cover light-guide 408. A wheeling unit 504 may be provided to deploy and retrieve reflecting film 502, manually or automatically under the control of controller 106. When natural light is sufficient to illuminate LCD panel 104, light source 410 may be turned off, and wheeling unit 504 retrieves reflecting film 502 to allow natural light to pass window glass 102 to illuminate LCD panel 104. On the other hand, when natural light is not sufficient to illuminate LCD panel 104, light source 410 may be turned on, and wheeling unit 504 deploys reflecting film 502 to reflect light emitted from light source 410 to improve efficiency of light source 410.

Figure 6:
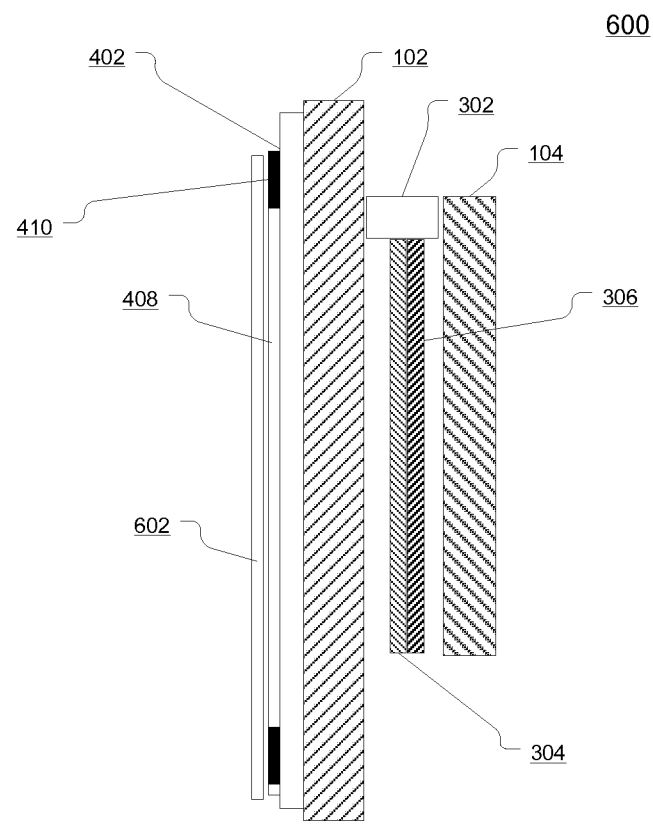
FIG. 6 illustrates an exemplary configuration of an LCD display consistent with the disclosed embodiments.

FIG. 6 illustrates an exemplary configuration of window glass 102 and LCD panel 104 forming an LCD display 600. As shown in FIG. 6, LCD display 600 includes window glass 102, LCD panel 104, coupler 302, concentrator film 304, diffuser film 306, frame 402, light-guide 408, and light source 410, as explained previously. Further, a single-direction film 602 may be positioned above light-guide 408 and may also be coupled to frame 402.

Single-direction film 602 may include any optical thin material that allows light pass through from one direction only and may reflect light from a reverse direction, such as a one-way mirror or any type of single direction transmission film or thin plate. Natural light may pass through single-direction film 602 to illuminate LCD panel 104 without turning on light source 410. However, when natural light is not sufficient, light source 410 may be turned on, light emitted from light source 410 may be provided by concentrator film 304 to illuminate LCD panel 104. Further, some light emitted from light source 410 may be reflected back by single-direction film 602 to improve the illumination of LCD panel 104.

Figure 7A:
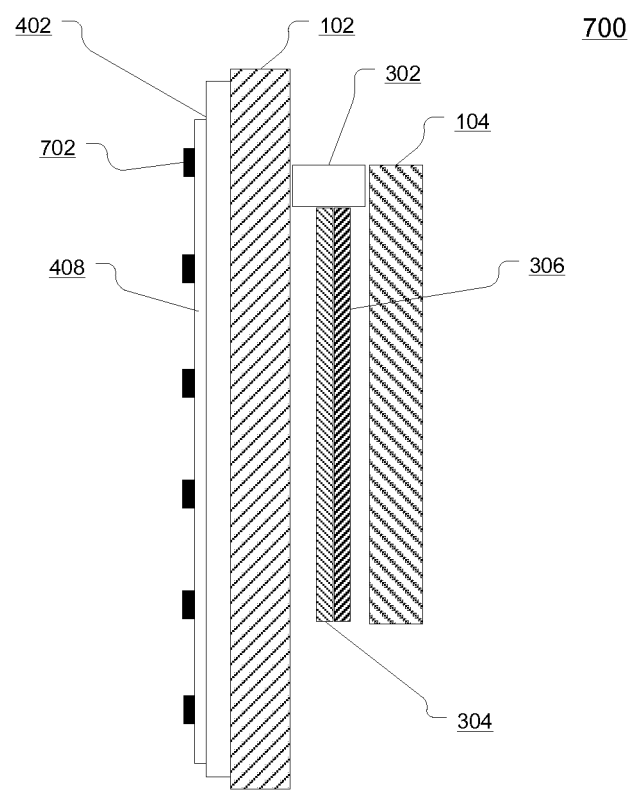
FIG. 7A illustrates an exemplary configuration of an LCD display consistent with the disclosed embodiments.

FIG. 7A illustrates an exemplary configuration of window glass 102 and LCD panel 104 forming an LCD display 700. As shown in FIG. 7A, LCD display 700 may include window glass 102, LCD panel 104, coupler 302, concentrator film 304, diffuser film 306, frame 402, and light-guide 408, as explained previously. Further, a plurality of LEDs 702 may be attached to light-guide 408. Natural light may pass through light-guide 408 to illuminate LCD panel 104 without turning on LEDs 702. However, when natural light is not sufficient, LEDs 702 may be turned on, light emitted from LEDs 702 may illuminate LCD panel 104 to supplement or replace natural light.

Figure 7B:
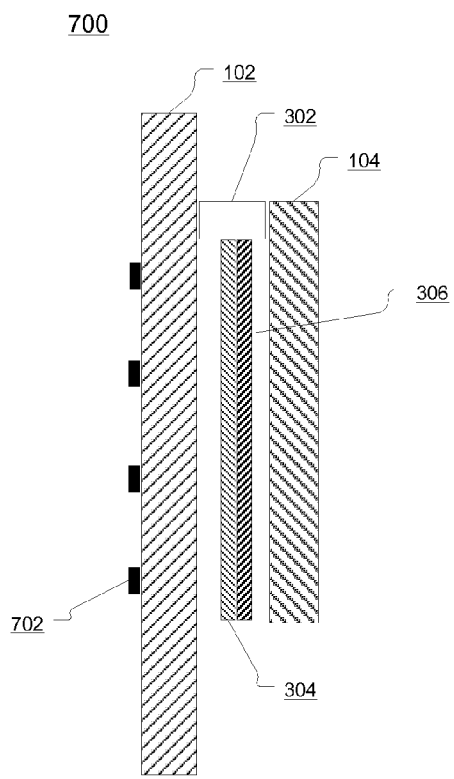
FIG. 7B illustrates another exemplary configuration of the LCD display consistent with the disclosed embodiments.
Figure 7C:
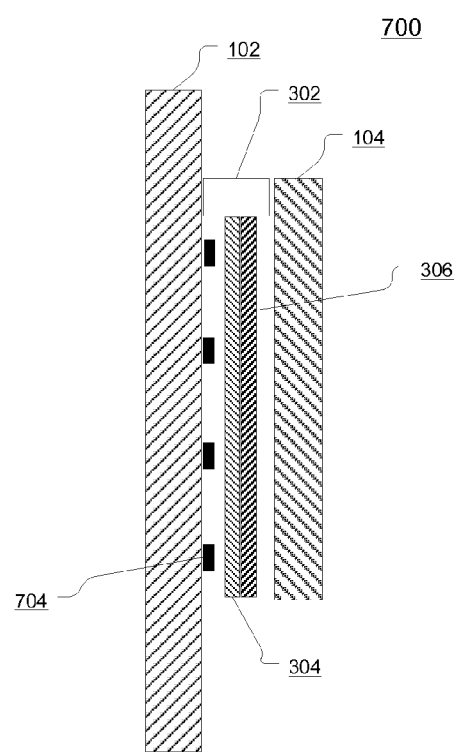
FIG. 7C illustrates another exemplary configuration of the LCD display consistent with the disclosed embodiments.

FIG. 7B and FIG. 7C illustrate simplified configurations from that in FIG. 7A. As shown in FIG. 7B, LEDs 702 are attached to the outside of window glass 102 directly, without frame 402 and light-guide 408, to provide light source to supplement or replace natural light. As shown in FIG. 7C, LEDs 702 are attached to the inside of window glass 102 directly, without frame 402 and light-guide 408, to provide a light source to supplement or replace natural light.

Figure 8:
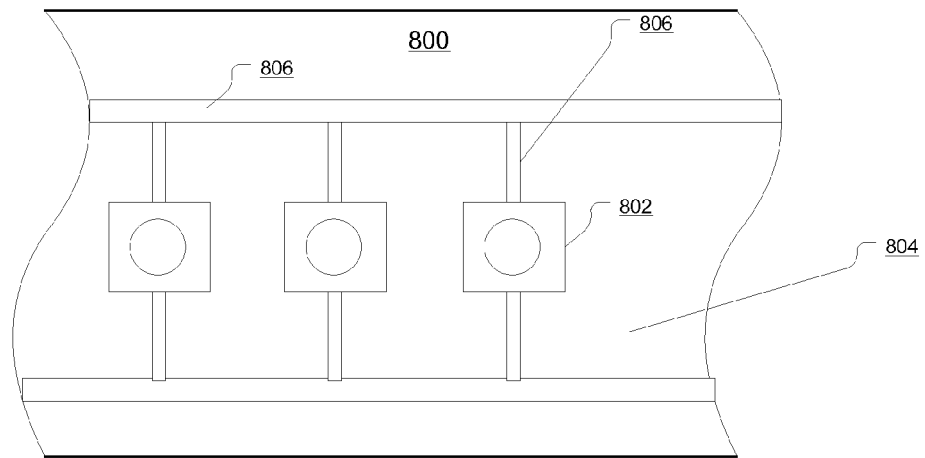
FIG. 8 illustrates an exemplary LED belt consistent with the disclosed embodiments.

The plurality of LEDs 702 may be arranged in any appropriate ways. FIG. 8 illustrates an exemplary LED belt 800 for arranging LEDs. As shown in FIG. 8, LED belt 800 includes a plurality of LED elements 802, transparent film 804, and electrically conductive lines 806. Each LED element 802 may include one or more LEDs for illuminating LCD panel 104. Electrically conductive lines 806 are provided to connect the plurality of LED elements to an electricity current source (not shown). Electrically conductive lines 806 may include any appropriate electrically conductive materials for connecting the plurality of LED elements, such as metal wires or transparent conductors (e.g., electrically conductive glue).

Figure 9A:
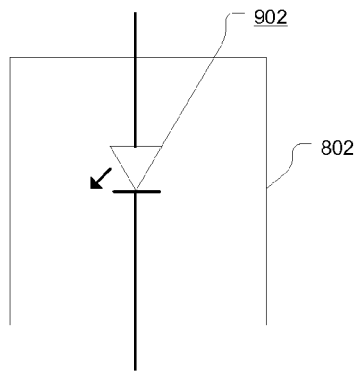
FIG. 9A illustrates an exemplary configuration of an LED element consistent with the disclosed embodiments.
Figure 9B:
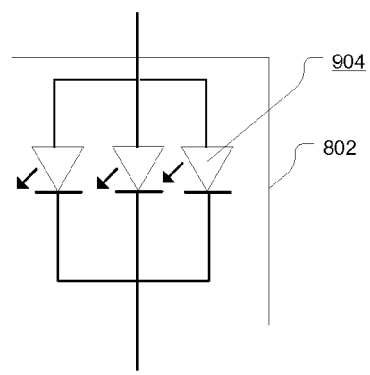
FIG. 9B illustrates another exemplary configuration of the LED element consistent with the disclosed embodiments.
Figure 9C:
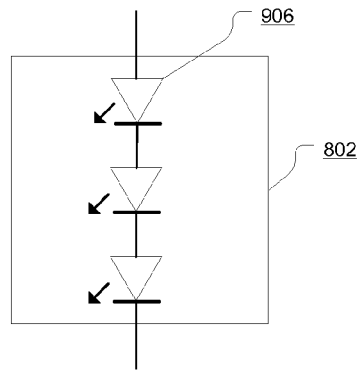
FIG. 9C illustrates another exemplary configuration of the LED element consistent with the disclosed embodiments.
Figure 9D:
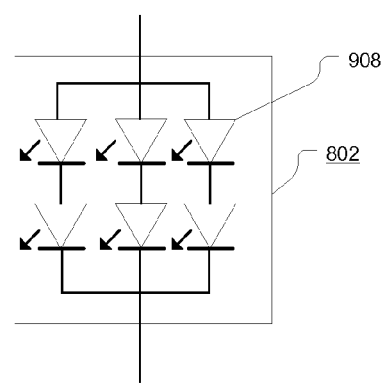
FIG. 9D illustrates another exemplary configuration of the LED element consistent with the disclosed embodiments.

Further, LED element 802 may include one or more LEDs, including LEDs emitting white light and LEDs emitting various color light, such as red, blue, and green light. FIGS. 9A, 9B, 9C, and 9D illustrates exemplary LED element configurations. More particularly, FIG. 9A illustrates that an LED element 802 includes a single LED 902. FIG. 9B illustrates that an LED element 802 includes a plurality of LEDs 904 connected in parallel. Although three LEDs are shown, any number of LEDs may be used. FIG. 9C illustrates that an LED element 802 includes a plurality of LEDs 906 connected in series. Again, although three LEDs are shown, any number of LEDs may be used. Finally, FIG. 9D illustrates that an LED element 802 includes a plurality LEDs 908 connected in parallel and in series. Although FIG. 9D shows two LEDs are connected in series and three series of LEDs are connected in parallel, any number of LEDs may be connected in parallel and/or in series.

For example, FIGS. 22A and 22B illustrate exemplary serially connected LED belts. As shown in FIG. 22A, LED belt 2202 includes a series of LED elements 802 connected in serial. In FIG. 22B, LED belt 2204 includes a series of LED elements each containing three light source 802(r), 802(g), and 802(b) for red, green, and blue light elements, respectively, such that a full color backlight may be formed.

Further, the LED belts (e.g., 800, 2202, and 2204, etc.) may be glued to light guide plate 408. FIG. 22C shows an exemplary light belt configuration. As shown in FIG. 22C, a plurality of LED belts 2206 are glued to light guide plate 408. Because the LED belts are made of transparent materials, natural light can pass through light guide plate 408 and LED belts 2206 for backlighting purposes. As shown in FIG. 22D, a plurality of LED belts 2206 can also be glued to a reflector plate 2208, because natural light cannot pass through the reflector plate 2208, only LED belts 2206 is used for backlighting.

Figure 23A:
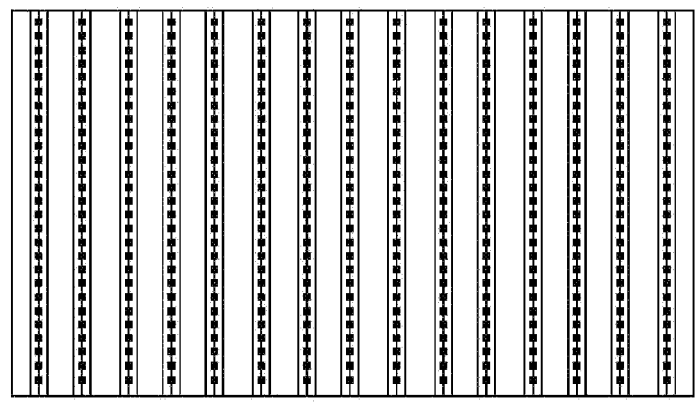
FIGS. 23A-23C illustrate exemplary LED backlighting configurations consistent with the disclosed embodiments.
Figure 23B:
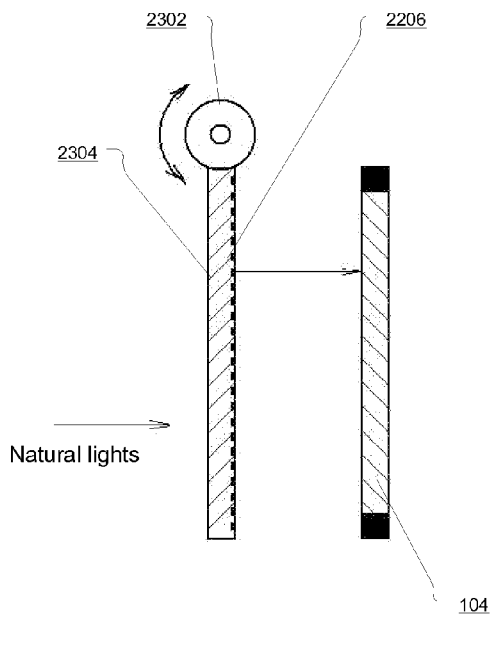

Because the flexibility of the various LED belts, those LED belts may be arranged in many different ways to fit display screens of different sizes and different backlighting systems. Further, the density of the LED in the belts or of the LED belts may be adjusted to achieve desired brightness. For example, FIG. 23A shows a plurality of LED belts being arranged on a large size light guide plate or reflector plate to provide backlighting. In FIG. 23B, LED belts 2206 are attached on a flexible light reflecting sheet material 2304, and sheet material 2304 is controlled by a wheeling device 2302. When natural light is sufficient for providing backlighting to LCD panel 104, wheeling device 2302 may be controlled to retract sheet material 2304 such that the natural light is used for backlighting. However, when the natural light is not sufficient for providing backlighting to LCD panel 104, wheeling device 2302 may be controlled to deploy sheet material 2304 such that the LED belts 2206 are used for backlighting, supplementing or replacing the natural light.

Figure 23C:
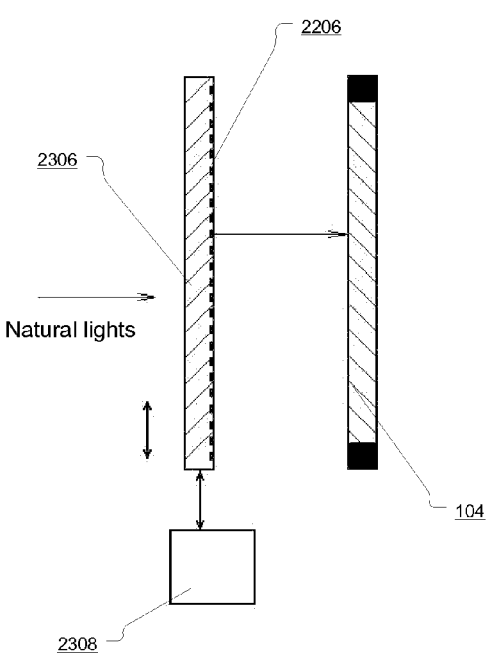

Further, in FIG. 23C, LED belts 2206 are arranged on a light reflecting plate 2306, and the light reflecting plate 2306 is controlled by an automatic mechanism 2308 for moving the plate 2306 in a vertical or horizontal direction, similar to an automatic window in an automobile. When natural light is sufficient for providing backlighting to LCD panel 104, automatic mechanism 2308 may be controlled to move plate 2306 to uncover LCD panel 104 such that the natural light is used for backlighting. However, when natural light is not sufficient for providing backlighting to LCD panel 104, automatic mechanism 2308 may be controlled to move plate 2306 to cover LCD panel 104 such that the LED belts 2206 are used for backlighting, supplementing or replacing the natural light.

Figure 10:
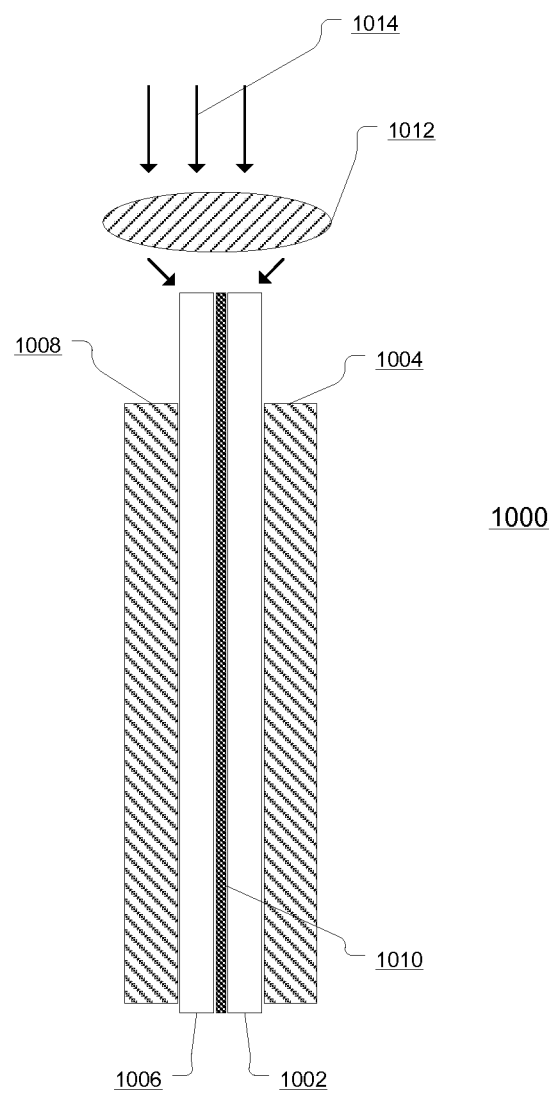
FIG. 10 illustrates an exemplary configuration of an LCD display consistent with the disclosed embodiments.

FIG. 10 illustrates an exemplary configuration of an LCD display 1000. As shown in FIG. 10, LCD display 1000 includes a light-guide 1002 and an LCD panel 1004 on one side of LCD display 1000, a light-guide 1006 and an LCD panel 1008 on the other side of LCD display 1000, and a reflecting film 1010. Light-guide 1002 and light-guide 1006 may be coupled together, and may include any appropriate structure such as a plate. Reflecting film 1010 may be placed between light-guide 1002 and light-guide 1006. Further, LCD display 1000 also includes a lens unit 1012 coupled to light-guide 1002 and light-guide 1006.

Lens unit 1012 may include any material and structure suitable collecting natural light 1014 and pass to light-guides 1002 and 1006. Although not shown, lens unit 1012 may be coupled to light-guide 1002 and light-guide 1006 via any appropriate means, such as direct coupling or optical fiber coupling. If optical fiber coupling is used, lens unit 1012 may be placed remotely and passes natural light through optical fibers to light-guides 1002 and 1006.

Natural light collected by lens unit 1012 passes through light-guides 1002 and 1006 to illuminate LCD panels 1004 and 1008, respectively. Reflecting film 1010 also reflects natural light back to LCD panels 1004 and 1008. Although two light-guides and LCD panels are illustrated in FIG. 10, a single-sided light-guide and LCD panel may also be used. Further, LEDs (not shown) may also be provided to supplement natural light by, as explained previously, attaching to a side of light-guide 1002 or 1006 or both.

In certain embodiments, light guide 1002 and light-guide 1006 may be pressed, molded, welded, or adhered into a single light-guide, while reflecting film 1010 may also be pressed, molded, welded, or adhered into the single light-guide. Further, in certain other embodiments used in an environment with strong natural light, reflecting film 1010 may be omitted in the single light-guide.

Figure 11:
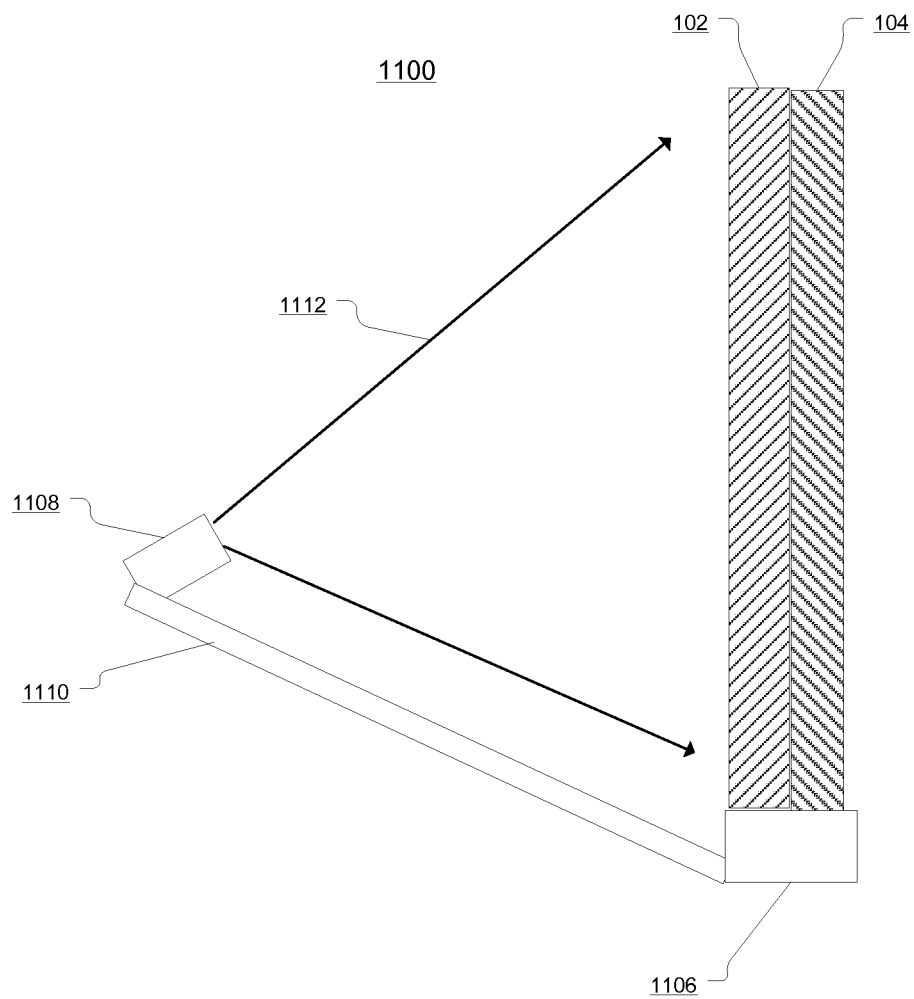
FIG. 11 illustrates an exemplary configuration of an LCD display consistent with the disclosed embodiments.

FIG. 11 illustrates an exemplary configuration of an LCD display 1100. As shown in FIG. 11, LCD display 1100 includes window glass 102, LCD panel 104, and a base 1106. Window glass 102 may also include any appropriate transparent or translucent material for passing natural light to relatively evenly illuminate LCD panel 104. For example, window glass 102 may include a diffuser glass or the like. LCD panel 104 may include one or more LCD panels as explained previously. Base 1106 may include any appropriate structure configured to support window glass 102 and LCD panel 104 and any other applicable components. Natural light pass through window glass 102 to illuminate LCD panel 104.

Further, LCD display 1100 may also include one or more projection lamps 1108 to emit light to supplement natural light when natural light is not sufficient, such as at night or in an environment or weather with insufficient ambient light. One or more support beams 1110 are coupled to base 1106 at one end and to one or more lamps at the other end to support one or more lamps 1108. Lamps 1108 and support beams 1110 are configured in certain ways such that light 1112 emitted from lamps 1108 illuminates about entire area of window glass 102 relatively evenly. Other structures may also be used.

The above various configurations of LCD displays are described for illustration purposes. The various configurations may be used interchangeably and/or may be used in combination. For example, mechanisms of coupling window glass 102 and LCD panel 104 and of supplementing natural light in various configurations may be used in different configurations and/or may be combined in a single configuration.

Returning to FIG. 1, controller 106 may automatically control LCD system 100 in operation. In certain embodiments, because natural light is used to illuminate LCD panel 104, the amount of energy, circuitry, and space may be saved such that controller 106 may be fully integrated into LCD panel 104 without external power sources. Thus, LCD system 100 may be deployed in a self-contained manner, perhaps with a solar energy unit for supplying a small amount of power for system operation.

Figure 12:
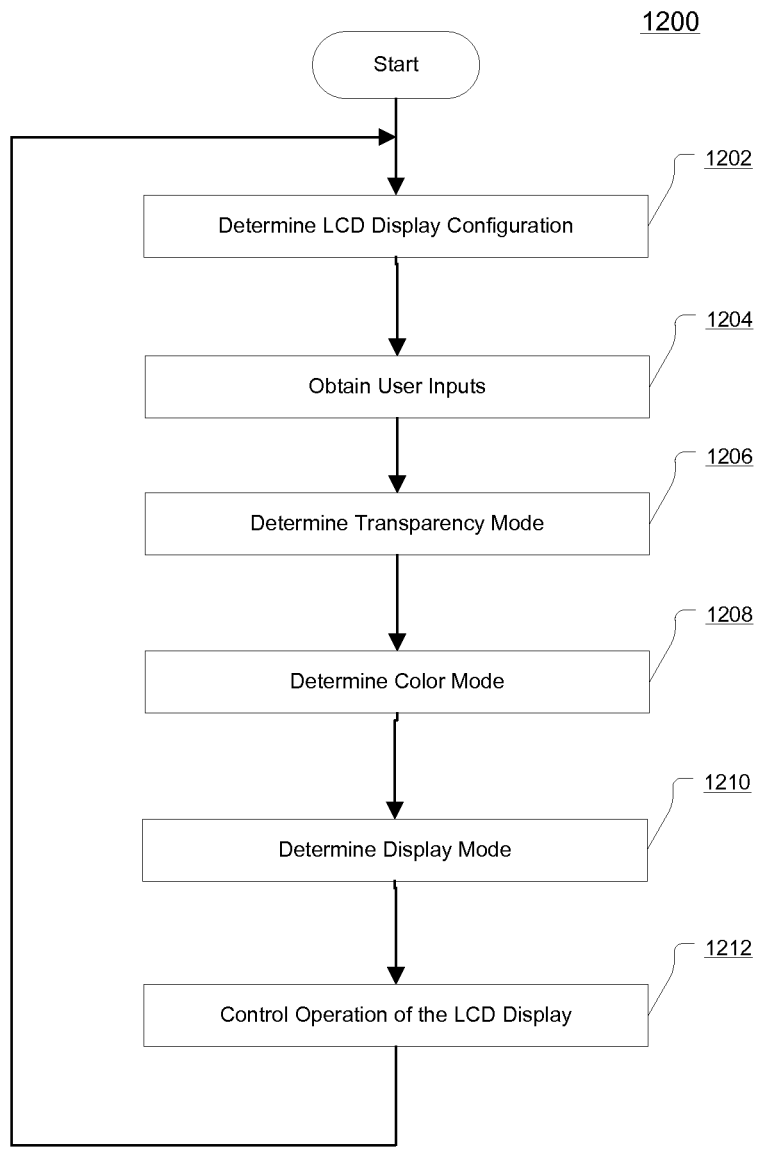
FIG. 12 illustrates an exemplary operation process for an LCD system consistent with the disclosed embodiments.

In operation, controller 106 and, more particularly, CPU 202 may execute computer instructions to perform certain actions to control operation of LCD system 100. FIG. 12 illustrates an exemplary process 1200 performed by controller 106 or, more specifically, by CPU 202 of controller 106.

As shown in FIG. 12, in operation, CPU 202 may determine LCD display configuration (1202). The configuration may include information about various LCD display configurations explained previously, such as types and mechanisms of supplemental light, and operation parameters for natural light operation (i.e., natural light as the only light source to illuminate an LCD panel) and natural light and supplemental light operation (i.e., supplemental light is provided to illuminate the LCD panel), etc. CPU 202 may determine the LCD configuration based on predefined criteria. For example, CPU 202 may read information from a database or a file, or CPU 202 may determine the configuration in real-time by obtaining information from related devices.

CPU 202 may also obtain user inputs (1204). A user of LCD system 100 may input certain information to control and/or operate LCD system 100. For example, the user may choose a transparency mode, a color mode, and a display mode, as described below, as well as what contents to be displayed on LCD system 100. For example, the user may choose to display a still image, a video image, text messages, or any combination thereof via input unit 222.

Based on the user input and/or preconfigured parameters, CPU 202 may determine a transparency mode for the LCD display (1206). For illustration purpose, LCD display configuration as shown in FIG. 3C is used to describe transparency mode operation, which may also be incorporated into other configurations without departing from the principle of the disclosed embodiments.

CPU 202 may determine a full-transparent mode, in which CPU 202 may control transparency control unit 310 to be fully transparent, and may also control LCD panel 104 to be transparent as well. CPU 202 may also determine a translucent mode, in which CPU 202 may control transparency control unit 310 to reach a certain degree of transparency based on preconfigured parameters or user inputs.

Further, CPU 202 may also determine a color mode for the LCD display (1208). CPU 202 may set a color for LCD panel 104 to display according to the color mode. For example, CPU 202 may set a black-and-white mode for LCD panel 104, which may include the range from a transparent LCD panel to a black LCD panel. CPU 202 may also set a particular color for LCD panel 104 to be displayed in combination of different transparency degrees to have a desired visual effect.

CPU 202 may also determine a display mode for the LCD display (1210). For example, CPU 202 may determine a display mode for LCD panel 104 as one of a window mode, an entertainment mode, or a bulletin mode. Other modes may also be used. When selecting the window mode, CPU 202 may control LCD panel 104 to be transparent such that a transparent window may be provided for the user. Further, the user may select certain images that are complimentary of sceneries outside the window (i.e., at the opposite side of LCD panel 104), and CPU 202 may obtain the user's selection and control LCD panel 104 to display the certain images together with the outside sceneries. CPU 202 may also control LCD panel 104 to display certain color statically or dynamically such that a window with a various degree of transparency and colors may be provided for the user.

Further, when the user prefers to watch a video or the like, CPU 202 may select the entertainment mode for LCD panel 104. CPU 202 may also select a bulletin mode if the user prefers to use LCD system for displaying public information or other text based information, where the transparency mode may be set to the translucent mode to have desired visual effects.

Figure 13:
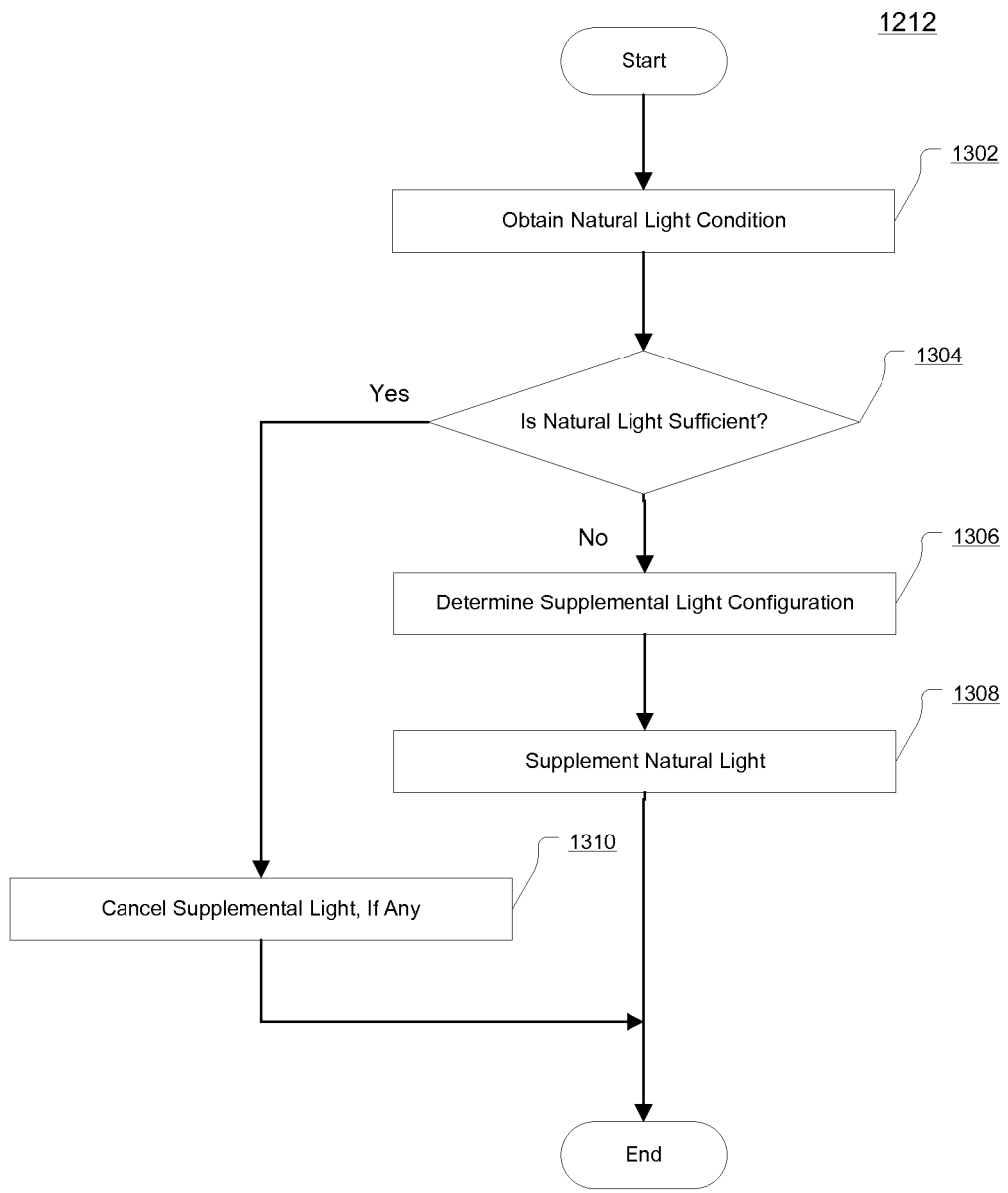
FIG. 13 illustrates an exemplary control process for an LCD system consistent with the disclosed embodiments.

After determining the various modes for LCD display (1206, 1208, 1210), CPU 202 may control operation of the LCD display according to the configuration, the user input, and the various modes (1212). FIG. 13 shows an exemplary control process 1212.

As shown in FIG. 13, CPU 202 may obtain a natural light condition (1302). For example, CPU 202 may obtain the strength, brightness, or other characteristics of natural light from sensors or other devices (not shown). CPU 202 may also obtain the natural light condition based on a user input. Further, CPU 202 may determine whether natural light is sufficient to illuminate LCD panel 104 (1304).

If CPU 202 determines that natural light is sufficient to illuminate LCD panel 104 (1304; yes), CPU 202 may continue using natural light as the light source for illuminating LCD panel 104 and turn off or cancel any supplemental light sources, such as reflector, LEDs, and/or projection lamps (1310). On the other hand, if CPU 202 determines that natural light is not sufficient to illuminate LCD panel 104 (1304; no), CPU 202 may determine available supplemental light configuration (1306). For example, CPU 202 may determine whether LCD system 100 includes any supplemental light source or sources for illuminating LCD panel 104, such as reflector, LEDs, and/or projection lamps. Further, CPU 202 may control relevant supplemental light source or sources to supplement the natural light (1308). For example, CPU 202 may turn on LEDs, deploy reflectors or reflecting films, and/or turn on projection lamps. Other steps and actions may also be included.

Figure 26A:
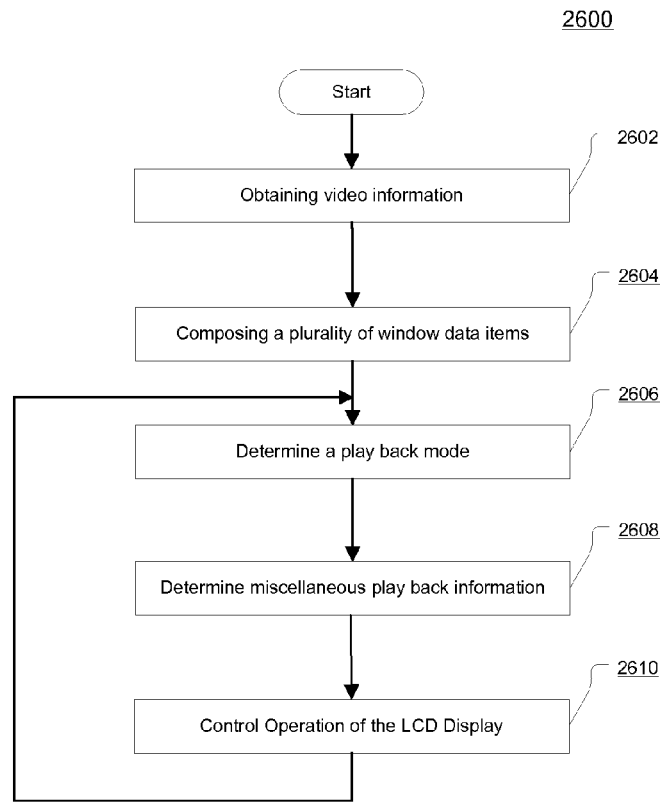
FIG. 26A illustrates an exemplary electronic window process consistent with the disclosed embodiments.

In addition, the LCD display or LCD panel 104 may also be used as an electronic window, i.e., a display simulating sceneries from a real window. CPU 202 may perform an electronic window process 2600 as shown in FIG. 26A. At the beginning, CPU 202 may obtain video information for the electronic window (2602). For example, a user may record video with respect to various scenes, such as beaches, gardens, mountains, waterfalls, and scenic spots, etc., for all-weather. The recorded video may be stored in a certain database accessible by CPU 202, and CPU 202 may obtain video information from the database.

Figure 26B:
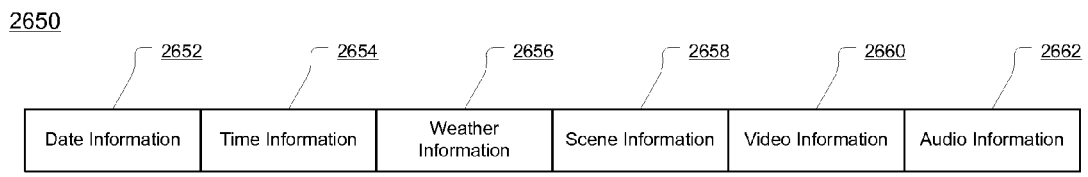
FIG. 26B illustrates an exemplary window data item consistent with the disclosed embodiments.

Further, CPU 202 may compose a plurality of window data items for display (2604). A window data item may refer to a basic data item to be independently displayed on LCD panel 104 for the electronic window. FIG. 26B shows an exemplary window data item consistent with the disclosed embodiments. As shown in FIG. 26B, window data item 2650 may include date information 2652, time information 2654, weather information 2656, scene information 2658, video information 2660, and audio information 2662. Other information may also be included.

Date information 2652 includes day, month, year, and season, etc., of the data item; time information 2654 includes time of the day of the data item; weather information 2656 includes what weather condition original images were taken and/or for which weather the data item is intended; scene information 2658 includes what sceneries of the original images and/or for which scene the data item is intended; video information 2660 includes the original images and other video information; and audio information 2662 includes any corresponding audio information of the data item.

Returning to FIG. 26A, after composing the plurality of window data items for display (2604), CPU 202 may determine a play back mode (2606). For example, CPU 202 may provide various play back modes and may choose a particular display mode based on a user input or a predetermined algorithm. The various play back modes may include a basic play mode where the window data items are played in a loop according to the current date and time.

In addition to the basic play mode, the various play back modes also includes a natural play mode, in which nature light is used as backlight and background, and no supplemental backlighting is needed. The various play back modes also includes sequential play mode, in which sceneries are played in a play sequence by time and date. The various play back modes also includes a weather play mode, in which sceneries corresponding to current weather condition are played. The various play back modes also includes a season-reversing play mode, in which sceneries in a season opposite to the current season are played (e.g., summer sceneries are played in winter, etc.). The various play back modes also includes a weather-reversing play mode, in which sceneries in weather opposite to the current weather are played (e.g., snowing sceneries are played in hot days, etc.). The various play back modes also includes an emotional play mode, in which sceneries smoothing people's emotions may be played. Further, the various play back modes also includes a time-difference play mode, in which a delayed scenery with respect to current time are played to introduce a difference in time. Other play back modes may also be used.

After determining the play back mode (2606), CPU 202 may also determine miscellaneous play back information (2608). For example, CPU 202 may determine corresponding audio to be played together with the video with proper volume and sound effects. CPU 202 may also determine auxiliary sceneries provided by auxiliary equipment, such as an oxygen generator, refrigeration equipment, a negative ion generator, an ozone generator, an ultrasonic rain and fog generator, and a smell generators, etc. CPU 202 may control the auxiliary equipment to achieve corresponding secondary effects to the sceneries. For example, when playing snow scenes, temperature is also lowered using the refrigeration equipment; when playing garden scenes, flower smell is generated using the smell generator; when playing forest scenes, oxygen is generated using the oxygen generator; when playing thunder storm scenes, negative ion generator and the ozone generator may also be used to provide negative ion and ozone, respectively, and when playing rain sceneries, rain and fog generator may be used to create rain and frog. Further, CPU 202 may control corresponding operation of the LCD display (2610).

Although the above-described display systems often involve window glass 102, the various display system may also be configured to be independent from window glass 102. For example, a such display system may include a simplified display system capable of coupling to a plurality of separate backlight devices. The simplified display system may include LCD panel 104 coupled with light guide plate 408 and controller or control circuitry 106. That is, the display system has a open-back configuration to accept backlight from various backlight sources, such as natural lights, LEDs, and other light sources. In addition, protection, support, install, and structure of these display systems may also be configured to significantly reduce cost and to improve user experience. FIG. 14A illustrates an exemplary installation of LCD panel 104 consistent with the disclosed embodiments.

As shown in FIG. 14A, LCD panel 104 may be coupled with light-guide plate 408 via coupler 1402 (e.g., coupler 302 in FIG. 3A), which may be a front-frame. That is, light guide plate 408 and LCD panel 104 may be made as a separate display component. Front frame 1402 may be connected with light guide plate 408 by using mechanical fastening means such as screws, press forming (thermo-compression), splicing, heat sealing, welding (ultrasonic soldering), molded casting, injection molding, etc. Thus, LCD panel 104 may be integrated with light guide plate 104 into a single device. FIG. 14A shows that front-frame 1402 is attached at the surface of light guide plate 408. FIG. 14B shows that front-frame 1402 encloses both edges of light guide plate 408 and LCD panel 104. FIG. 14C shows that front-frame 1402 also encloses both edges of light guide plate 408 and LCD panel 104, but does not exceed the outer surface of light guide plate 408.

As shown in FIG. 14D, light guide plate 408 may be closely coupled to LCD panel 104 to provide physical protection, support, and fixation of LCD panel 104. For example, LCD panel 104 may be glued to light guide plate 408 by glue 801, which may be a transparent or half-transparent material, or a two-sided glue film based on a transparent or half-transparent substrate.

FIGS. 15A-15C further show exemplary configurations of front-frame 1402. As shown in FIG. 15A, front-frame 1402 circumvents LCD panel 104. As shown in FIG. 15B, front-frame 1402 only covers two sides of LCD panel 104. Further, as shown in FIG. 15C, front-frame 1402 only covers one side of LCD panel 104.

FIGS. 16A-16D illustrate exemplary configurations of light-guide 408. As shown in FIG. 16A, light guide plate 408 is connected with LCD panel 104. The size of light guide plate 408 may be larger than that of LCD panel 104, and the area beyond what is covered by LCD panel 104 is denoted as area "A". Further, as shown in FIG. 16B, one or more hollow spaces 610 may be pre-made to hold various components of the LCD display system. For example, the one or more hollow spaces 610 may hold controller 106 or other circuitry components. The hollow spaces 610 may be of any shape, and may be through or non-through.

As shown in FIG. 16C, hollow space 610 in light guide plate 408 is not through and holds controller 106. A front frame 1402 covers the area "A" as well as the hollow space 610. On the other hand, as shown in FIG. 16D, hollow space 610 is through, a back frame 402 is used to cover area "A", in addition to the front frame 1402.

Figure 17A:
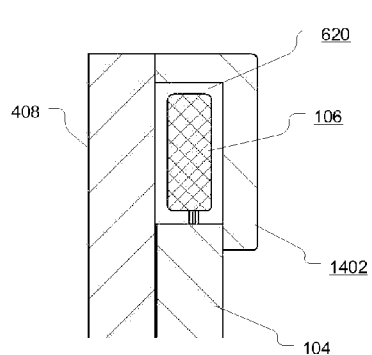
FIGS. 17A-17F illustrate other exemplary configurations of a front frame consistent with the disclosed embodiments.
Figure 17B:
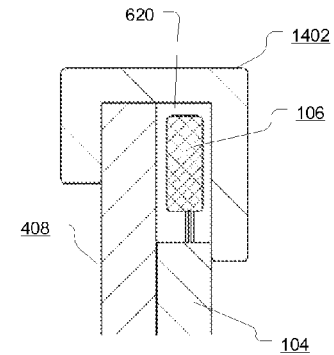
Figure 17C:
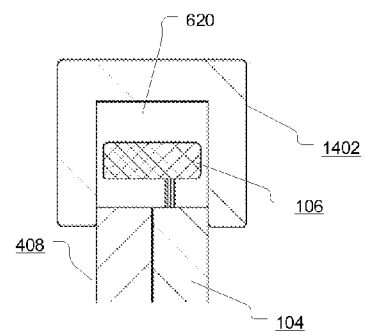

Further, when coupling with light guide plate 408 and LCD panel 104, front frame 1402 may form one or more hollow spaces 620 together with light guide plate 408 and LCD panel 104, and the one or more hollow spaces 620 may be used to hold, for example, controller 106 or other control circuitry components. FIGS. 17A-17C illustrate exemplary configurations associated with front frame 1402.

As shown in FIG. 17A, front frame 1402 only covers area "A" of light guide plate 408 such that hollow space 620 is formed between front frame 1402 and light guide plate 408 over area "A". In FIG. 17B, front frame 1402 also covers an edge of light guide plate 408. In FIG. 17C, however, area "A" is no longer exists, and light guide plate 408 and LCD panel 104 are of the same size. Front frame 1402 may be used to couple light guide plate 408 and LCD panel 104 at the edge, and hollow spaces 620 may be formed at the edge of light guide plate 408 and LCD panel 104.

Figure 17D:
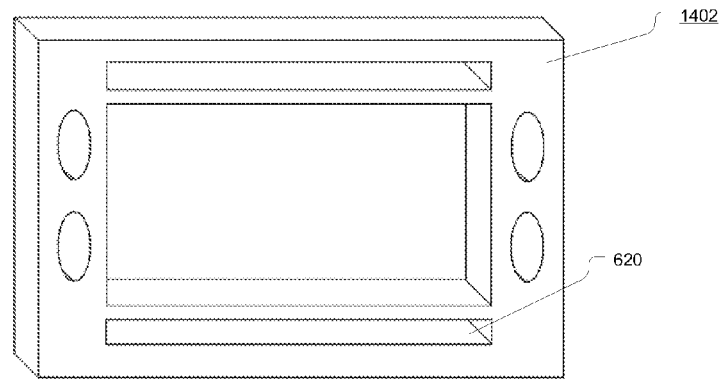
Figure 17E:
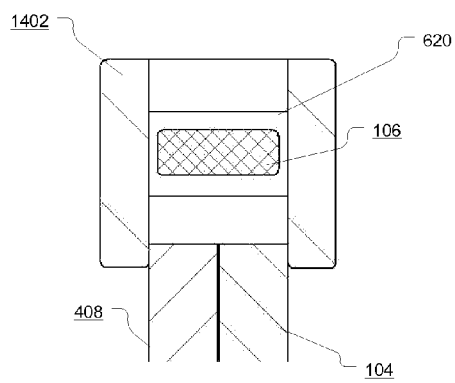
Figure 17F:
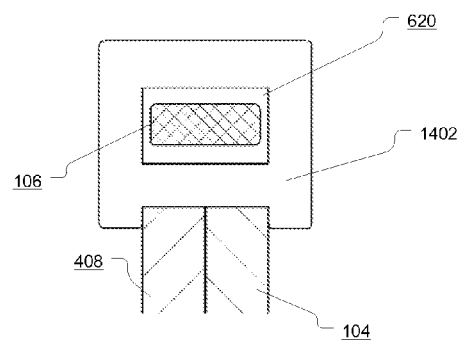

Further, front frame 1402 may be a single frame as shown in FIG. 17D, made of plastic, wood, or metal, and may also contain pre-made hollow spaces 620, which may also be of any shape, and may be through or non-through. FIG. 17E shows a through hollow space 620 in front frame 1402, while FIG. 17F shows an internal chamber formed inside front frame 1402 to hold controller 106 and/or other components, such as speakers.

Front frame 1402 may also be made of metal profiles (e.g., aluminum profiles) and/or non-metallic profiles. Hollow space 630 may be made during the manufacturing the metal or non-metal profiles. The front frame 1402 may thus automatically contain hollow spaces 630 when coupling or connecting light guide plate 408 and LCD panel 104. FIGS. 18A-18H illustrate exemplary configurations associated with front frame 1402.

Figures 18A, 18B, 18C, 18D:
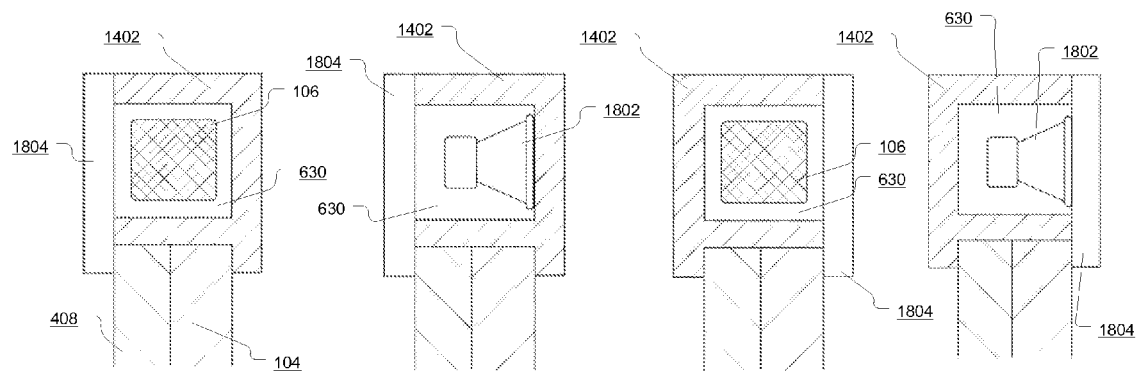
FIGS. 18A-18H illustrate exemplary configurations associated with a front frame consistent with the disclosed embodiments.

As shown in FIG. 18A, the opening of the front frame 1402 (e.g., a metal profile) is rear-facing, and a cover 1804 may be used to cover hollow space 630 after controller 106 or other components are placed within the hollow space 630. In FIG. 18B, one or more speakers 1802 are placed within the hollow space 630. Further, in FIG. 18C, the opening of the front frame 1402 is front-facing, and is also covered by cover 1804 after controller 106 or other components are placed within the hollow space 630. Again, in FIG. 18D, one or more speakers 1802 are placed within the front-facing hollow space 630.

Figures 18E, 18F, 18G, 18H:
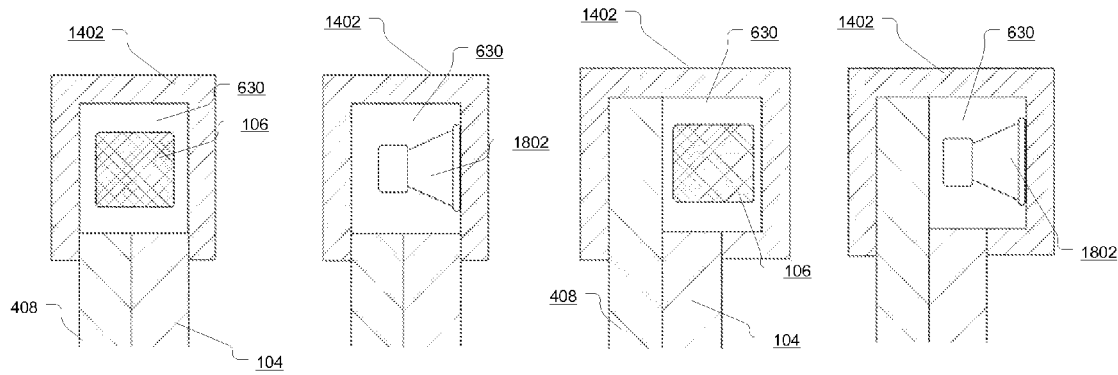

In FIG. 18E, the opening of the front frame 1402 is used to couple light guide plate 408 and LCD panel 104, and thus a cover is not needed. Controller 106 or other components are placed within the hollow space 630. In FIG. 18F, one or more speakers 1802 are placed within the hollow space 630. Further, in FIG. 18G, the opening of the front frame 1402 (e.g., a metal profile) may also be used to cover area "A" in addition to coupling or connecting light guide plate 408 and LCD panel 104. Controller 106 or other components are placed within the hollow space 630. Again, in FIG. 18G, one or more speakers 1802 are placed within the hollow space 630.

As disclosed previously, backlight system may be separated from a display system. After the separation, for large screens and/or multi-block large screens, desired mechanisms for fixing and supporting the large screens and installing the control circuitry may be needed. FIGS. 19A and 19B illustrate exemplary installations. As shown FIG. 19A, a plurality of LCD panels 104 are coupled to a single light guide plate 408 during installation, while, as shown in FIG. 19B, a single LCD panel 104 is coupled to a single light guide plate 408 and then the coupled component may be installed with other similar components to form a large screen.

For installations, controller 106 or other control circuitry may be placed only at one or two sides of LCD panel 104 to facilitate forming a large screen with other LCD panels. Further, when coupling light guide plate 408 and LCD panel 104, the installation of the control circuit 106 can be performed by various methods as shown in FIGS. 20A and 20B.

In FIG. 20A, light guide plate 408 and LCD panel 104 are coupled using an appropriate adhesive material (e.g., glue) 801, and controller 106 or other control circuitry is fixed at a side of LCD panel 104 using glue or resin 802. In FIG. 20B, controller 106 or other control circuitry is fixed at an edge of light guide plate 408 also using the adhesive material 801. Further, a thin film of plastic or metal protection cover 2002 is used to wrap the edge of the coupled devices to protect controller 106 and other devices.

Further, in a large screen or ultra-large screen system, a display system and a backlight system can be connected together by a rotating structure. The rotating structure can be arranged on either side of four sides of the display system or the backlight system. As shown in FIG. 21A, rotating structure 2106 is arranged at the upper side of backlight system 2102, display system 2104 may be opened around rotating structure 2106 in an up-down manner. While, in FIG. 21B, rotating structure 2106 is arranged at the right side of backlight system 2102, display system 2104 may be opened around rotating structure 2106 in a side-by-side manner. Further, the backlight system 2102 may be generally installed on the wall, windows, or doors, with specific supports or bases.

Thus, more generally, a display system and a backlight system may be separately made and may be coupled together during installation or integration to form an entire system. The display system may refer to previously disclosed and/or explained various components coupled together, without the backlight system, to form a display function, such as LCD panel 104, light guide plate 408, controller 106, and front frame 1402, etc. The display system may support various backlight systems. Various configurations for arranging the display system and backlight system may be supported.

Figure 24A:
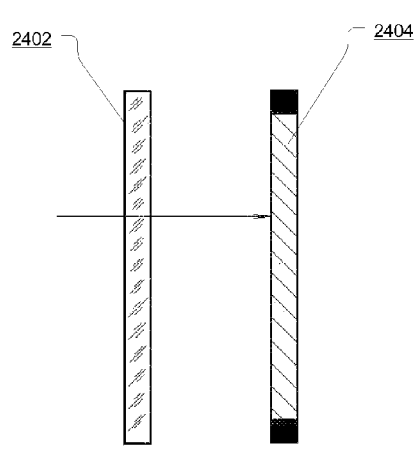
FIGS. 24A-24L illustrate exemplary configurations for arranging display systems and backlight systems consistent with the disclosed embodiments.
Figure 24B:
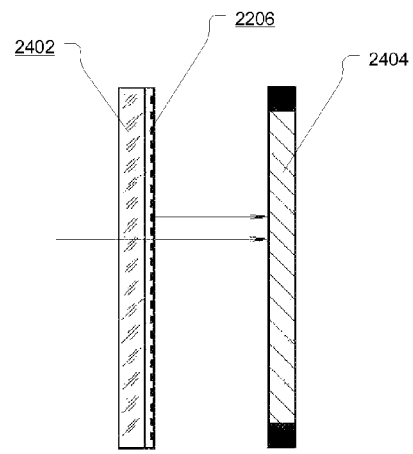

For example, in FIG. 24A, window glass 2402 is coupled to display system 2404, and the natural light is the only backlight source for display system 2404. In FIG. 24B, an LED belt(s) 2206 is attached to window glass 2402 such that both the natural light and the LED belt 2206 are backlight sources for display system 2404, i.e., when natural light is sufficient to backlight display system 2404, LEDs in LED belt 2206 are turned off, and when natural light is not sufficient or does not exist, LEDs in LED belt 2206 are turned on to provide backlight to display system 2404. That is, the LED is used as a supplemental backlight to the natural light.

Figure 24C:
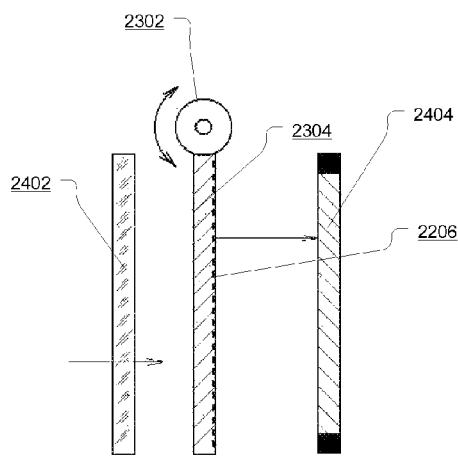

Further, in FIG. 24C, LED belts 2206 are attached on flexible light reflecting sheet material 2304 controlled by wheeling device 2302, which is coupled between window glass 2402 and display system 2404. As previously explained, when natural light is sufficient for providing backlighting, wheeling device 2302 may be controlled to retract sheet material 2304 such that the natural light alone is used for backlighting. However, when natural light is not sufficient for providing backlighting, wheeling device 2302 may be controlled to deploy sheet material 2304 such that the LED belts 2206 are used for supplementing or replacing the natural light.

Figure 24D:
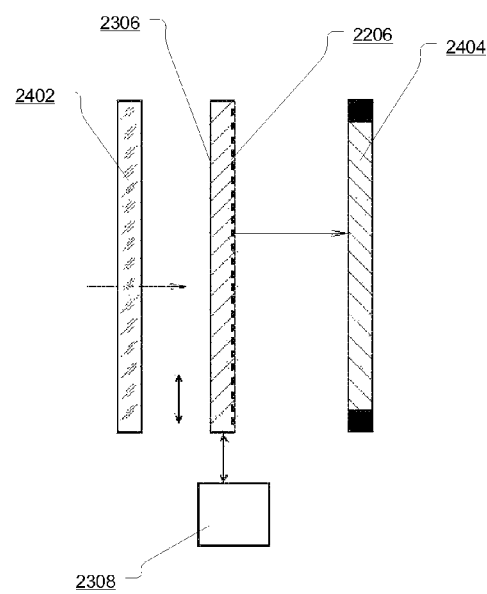

In FIG. 24D, LED belts 2206 are arranged on light reflecting plate 2306 controlled by automatic mechanism 2308, which is coupled between window glass 2402 and display system 2404. Also as previously explained, when natural light is sufficient for providing backlighting, automatic mechanism 2308 may be controlled to move plate 2306 to uncover display system 2404 such that the natural light is used for backlighting. However, when natural light is not sufficient for providing backlighting, automatic mechanism 2308 may be controlled to move plate 2306 to cover display system 2404 such that the LED belts 2206 are used for backlighting.

Figure 24E:
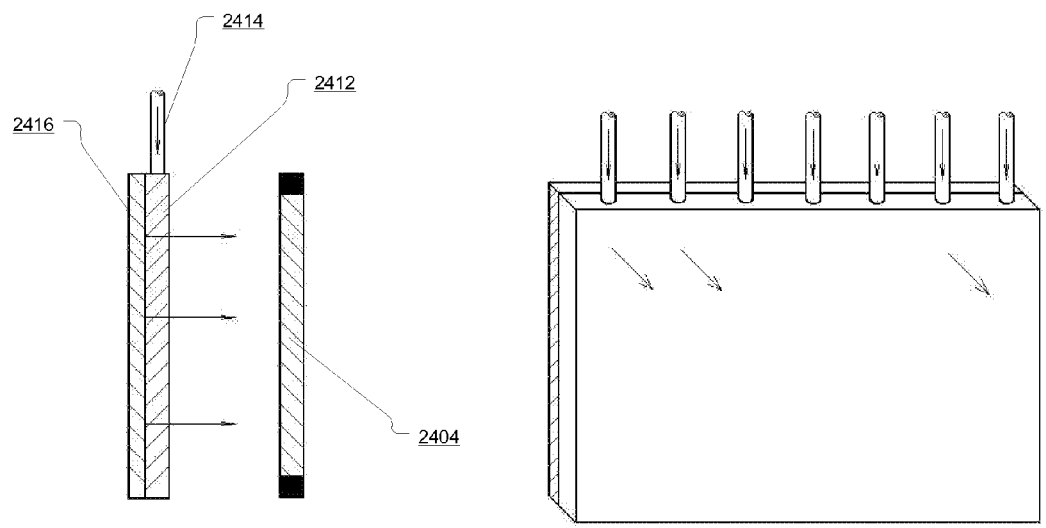

Further, optical fibers may be used to guide natural light or other light as backlight sources. In FIG. 24E, optic fiber device 2414 may be used to guide natural light into lightguide 2412 as the backlight for display system 2404, reflector or reflecting film 2416 is used to improve efficiency.

Figure 24F:
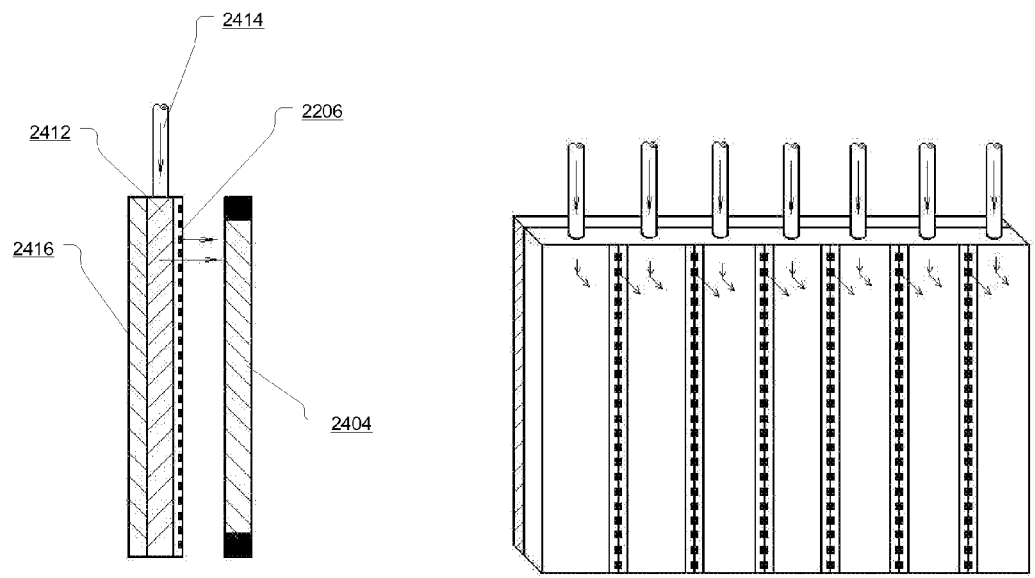
Figure 24G:
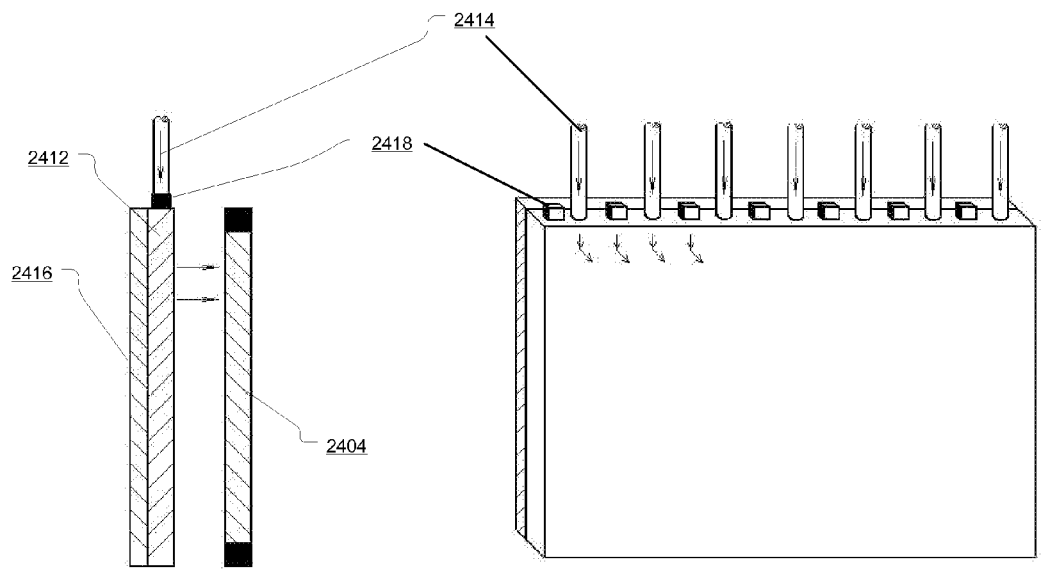

In addition, LEDs may also be used together with optic fibers to supplement the backlight. In FIG. 24F, LED belts 2206 is arranged on light-guide 2412 to supplement the natural light guided into light-guide 2412 by optic fiber device 2414. when natural light is sufficient for providing backlighting, LEDs in LED belts 2206 are turned off such that the natural light is used for backlighting. However, when natural light is not sufficient for providing backlighting, LEDs in LED belts 2206 are turned on such that the LED belts 2206 are used for supplementing or replacing the natural light. Further, in FIG. 24G, LEDs 2418 are directly placed on the edge of light-guide 2412 such that optic fiber device 2414 and LEDs 2418 can also both provide light sources into lightguide 2412 as backlight to display system 2404.

Figure 24H:
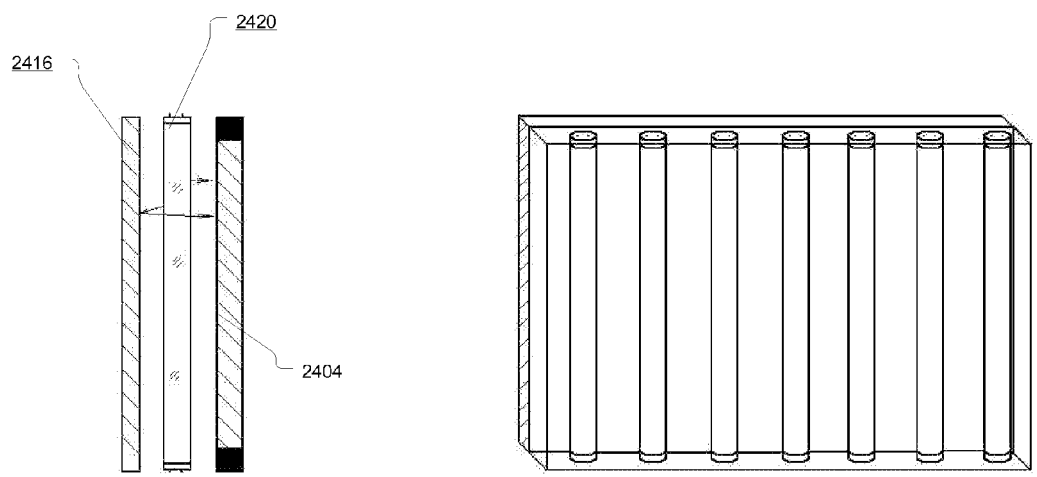
Figure 24I:
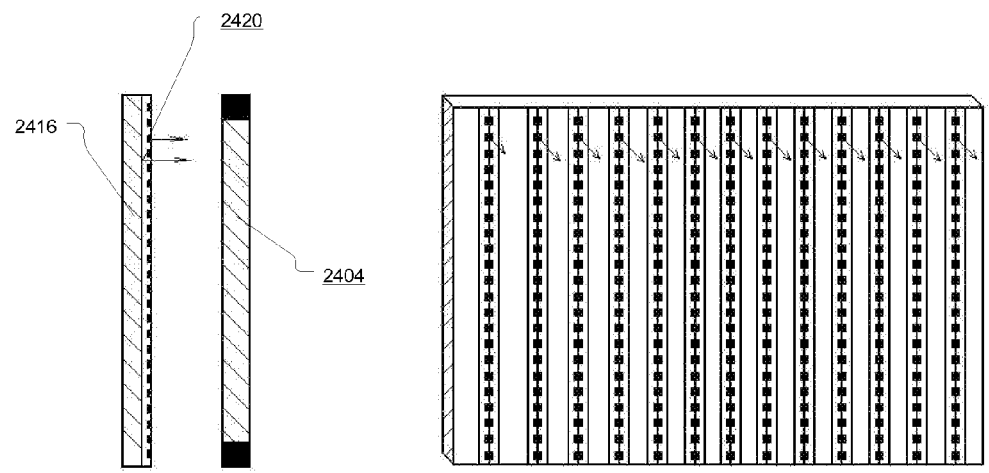

Further, other types of light may also be used as backlight sources. For example, in FIG. 24H, a plurality of cold cathode fluorescent lamps (CCFLs) are provided as the only backlight source for display system 2404, and reflector or reflecting film 2416 is used to improve efficiency. For another example, in FIG. 24I, LED belts 2206 may be used for the only backlight source for display system 2404, and reflector or reflecting film 2416 is also used to improve efficiency.

Figure 24J:
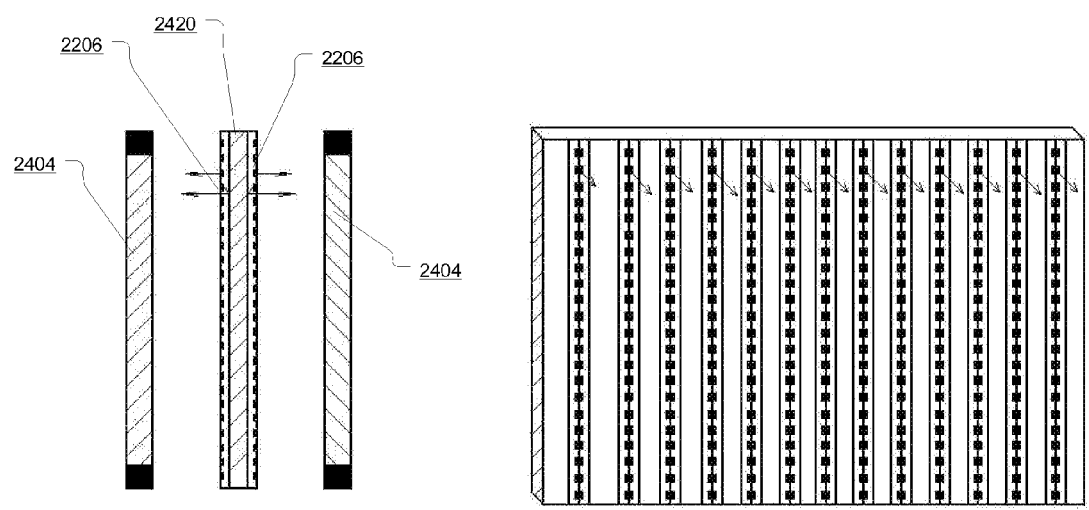
Figure 24K:
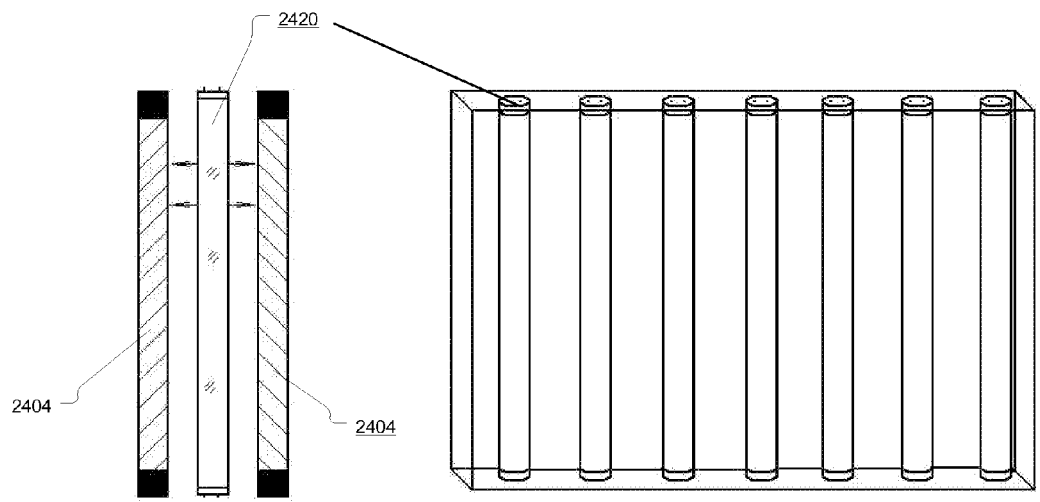
Figure 24L:
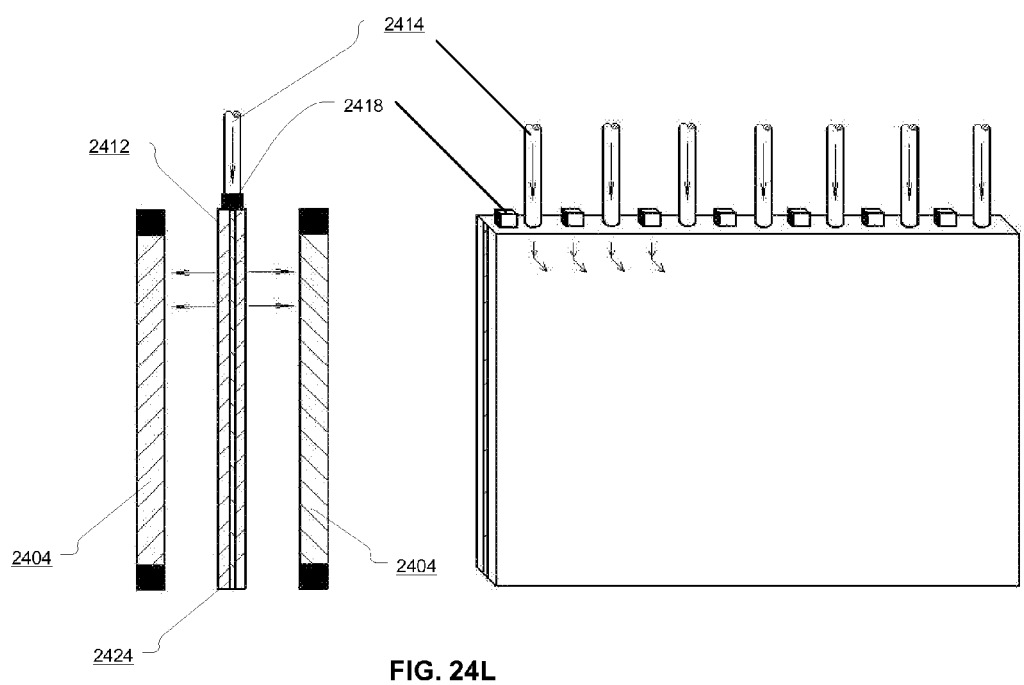

Moreover, the various light sources may also be used to provide backlight for back-to-back display systems. A back-to-back display system may include two display systems configured in a back-to-back manner to display information on both display systems. For example, in FIG. 24J, two LED belts 2206 are glued on the two sides of a reflecting plate 2420, respectively, such that the two LED belts 2206 independently provide backlighting to two back-to-back display systems 2404. In FIG. 24K, a plurality of CCFLs 2420 are coupled between two back-to-back display systems 2404 to provide backlighting. Further, in FIG. 24L, optic fiber device 2414 and light guide plate 2412 are used to provide backlighting to the two back-to-back display systems 2404. LEDs 2418 are provided to supplement or replace the natural light or other light source from optic fiber device 2414. Further, reflecting film 2424 may also be placed within light guide plate 2412 to improve lighting efficiency.

Light guide plate 2412 may include any appropriate type light guide materials. For example, as shown in FIG. 25B, light guide plate 2412 may include a thin film 2430 by casting the pre-made thin film 2430 into light guide plate 2412 during the manufacturing process. Further, as shown in FIG. 25A, thin film 2430 may be made with a plurality of reflecting convexes 2432 using, for example, printing methods. Thus, in FIG. 25B, incorporating the thin film printed with the plurality of reflecting convexes 2432, a plurality of reflective pits may be formed within light guide plate 2412 for guiding lights entering from the side of light guide plate 2412. Further, the density and size of the reflective pits may be adjusted when printing the thin film 2430 (e.g., a reflective film). Further, in FIG. 25C, film 2430 may be made with a plurality of reflecting convexes 2432 on both sides to form a two-side thin film 2430. FIG. 25D shows a two-side light guide plate 2412 incorporating the two-side thin film 2430 having printed plurality of reflecting convexes 2432 on both sides of thin film 2430. Other configurations may also be used.

Figure 27A:
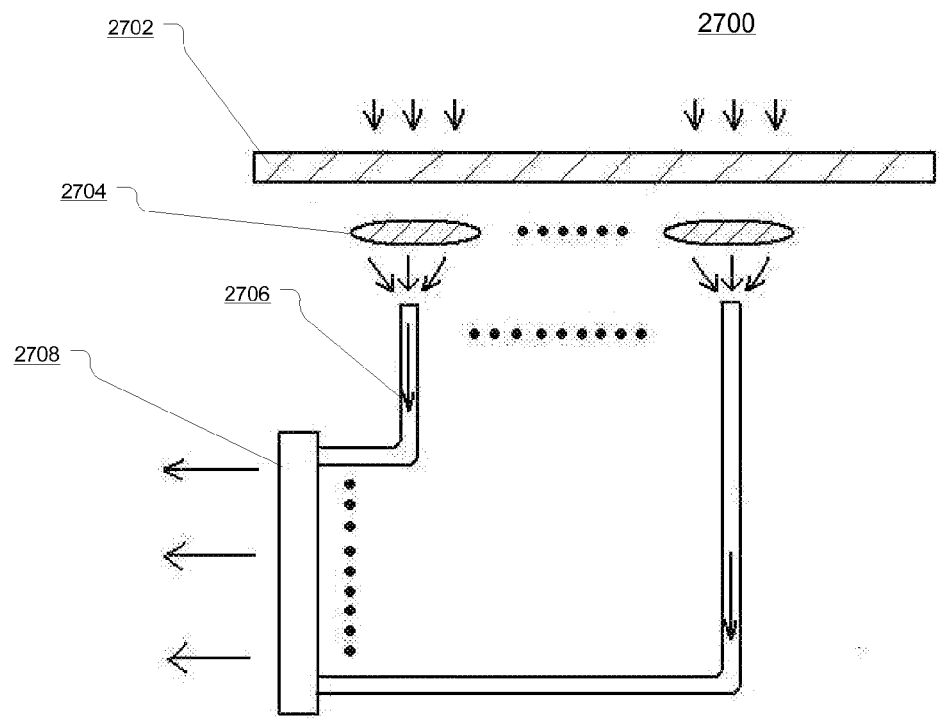
FIGS. 27A-27D illustrate exemplary signaling systems consistent with the disclosed embodiments.

FIGS. 27A-27D illustrate exemplary signaling systems based on disclosed display systems. As shown in FIG. 27A, signaling system 2700 may include an LCD display panel 2702, a series of convex lenses 2704, optic fibers 2706, and a signaling panel 2708. Other components may also be included.

LCD display panel 2702 is positioned on top of a plurality of convex lenses 2704 and exposed to sunlight. LCD display panel 2702 may be controlled to allow or not allow sunlight coming through LCD display panel 2702, and how much sunlight is allowed coming through, by control the transparency of the LCD display panel 2702. Sunlight passing through LCD display panel 2702 may be converged by convex lenses 2704. A plurality of optical fibers 2706 are positioned on the focal plane of convex lenses 2704. A plurality of optical fibers may be grouped together at the signal panel 2708. Concentrated and brightness-enhanced sunlight coming out of signal panel 2708 to create certain visual signals.

Figure 27B:
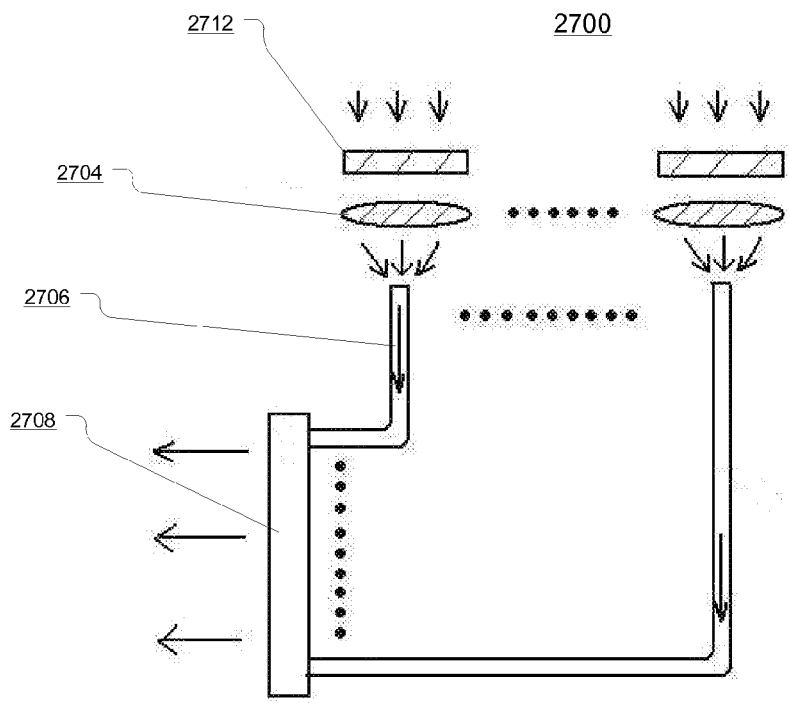
Figure 27C:
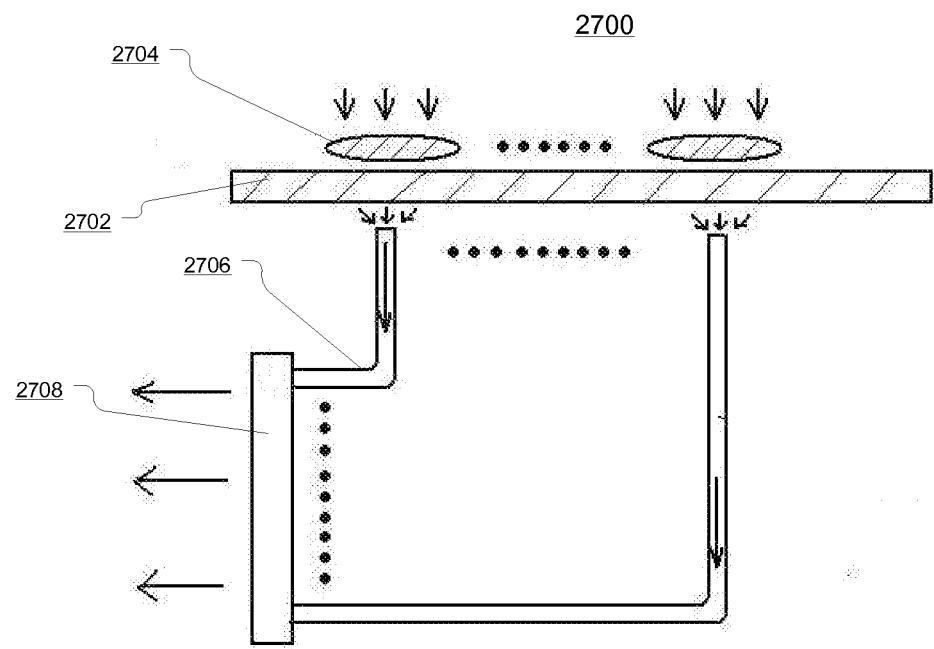
Figure 27D:
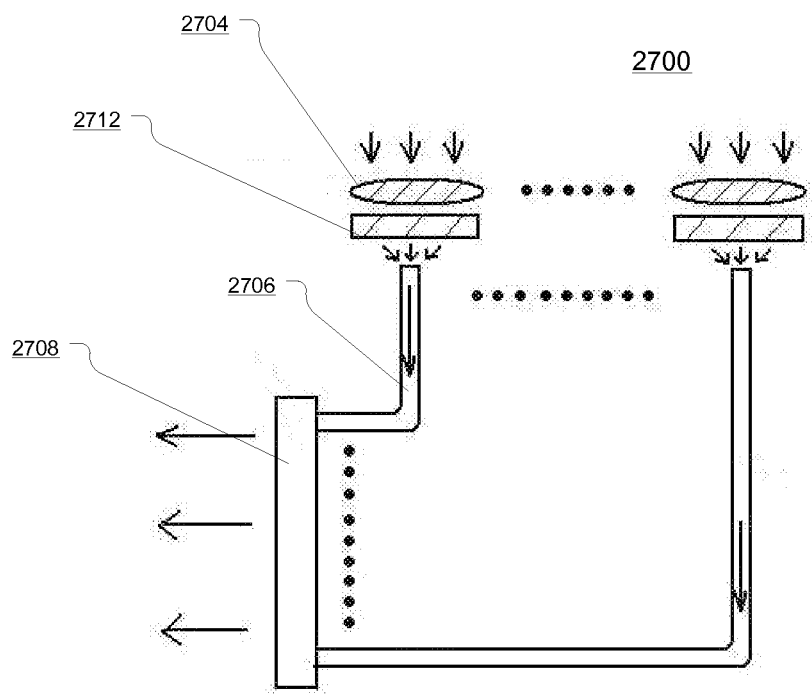

In FIG. 27B, instead of a single display panel 2702 in FIG. 27A, a plurality of LCD display panels 2712 are used, each corresponding to a convex lens 2704. Further, FIGS. 27C and 27D correspond to FIGS. 27A and 27B, respectively. However the positions of LCD display panel 2702 (and display panels 2712) and convex lenses 2704 are switched. Because optic fibers 2706 is flexible, LCD display panel(s) may be adjusted to face a direction with strong sunlight, and the signaling panel 2708 may also be adjusted to face a proper direction.

FIG. 28A shows an exemplary signaling panel 2800. As shown in FIG. 28A, signaling panel 2800 includes a plurality of optic fibers 2706 and, optionally, a plurality of LEDs 2804. The LEDs 2804 may supplement the sunlight when needed.

FIG. 28B shows an exemplary signaling panel 2850. As shown in FIG. 28B, signaling panel 2850 includes a plurality of panel elements 2806, and each circular element 2806 has an area 'B'. During operation, signaling panel 2850 can be turned on and off by allowing or disallowing sunlight passing through LCD display panel 2702 or LCD display panels 2712, and the brightness of signaling panel 2850 can be controlled by adjusting the size of area 'B' of panel elements 2806. Signaling panel 2850 may also be black-and-white or color by processing the sunlight. Further, In FIG. 28C, a panel element 2806 may be in a shape of circular strip, while in FIG. 28D, a panel element 2806 may be in a shape of a circular slice.

The disclosed LCD display systems may also be made into self-contained integrated display systems, with or without natural light backlighting. These display systems can be used for computer monitors, televisions, portable computers, digital picture frames, electronic books, cell phones, and two-sided display, etc. FIG. 29A shows an exemplary structure for such systems. As shown in FIG. 29A, display structure 2900 includes light guide plate 408 and LCD panel 104, similar to structures described in FIGS. 16A-16D. Light guide plate 408 is used as a main support structure for structure 2900, not only supporting LCD panel 104 and other components, but also providing a plurality of hollow spaces 610 for hosting control circuit or controller 106, a light source 410 and other components.

In FIG. 29B, hollow spaces 610 are further covered by a front frame 1402, and the light guide plate 408 is further covered by a cover 2904 on the side not coupled to LCD panel 104. In FIG. 29C, hollow spaces 610 are through. In FIG. 29D, hollow spaces 610 are not through, however light guide plate 408 and front frame 1402 fit at the edge. Further, FIG. 29E is similar to FIG. 29D, however hollow spaces 610 are through in FIG. 29E. In FIG. 29F, front frame 1402 covers all sides of structure 2900 except the side with LCD panel 104, and hollow spaces 610 may be formed by front frame 1402.

As explained previously, hollow spaces 610 may contain controller 106 and other control circuitry, backlighting light source 410, and other components. As shown in FIG. 30A, hollow spaces 610 from upper side and lower side of light guide plate 408 host light sources 410, which emit light towards the center of light guide plate 408, such that the light can be guided toward to LCD panel 104. Also, controller 106 and other control circuitry are hosted in a left side hollow space 610 and a lower side hollow space 610. In FIG. 30B, controller 106 and other control circuitry are hosted in an upper side hollow space 610 and a lower side hollow space 610, same as the light sources 410.

In FIG. 30C, controller 106 and other control circuitry are hosted in an upper side hollow space 610 and a lower side hollow space 610, same as the light sources 410. Front frame 1402 covers the hollow spaces 610, and cover 2904 covers the entire other side of light guide plate 408. In FIG. 30D, a two-sided display is used, two LCD panels 104 are coupled together with light guide plate 408, and two front frames 1402 are provided to cover hollow spaces 610 on both side of the display. Further, in FIG. 30E, front frames 1402 and light guide plate 408 fit at the edge, and in FIG. 30F, front frame 1402 wraps around the edges.

Figure 31A:
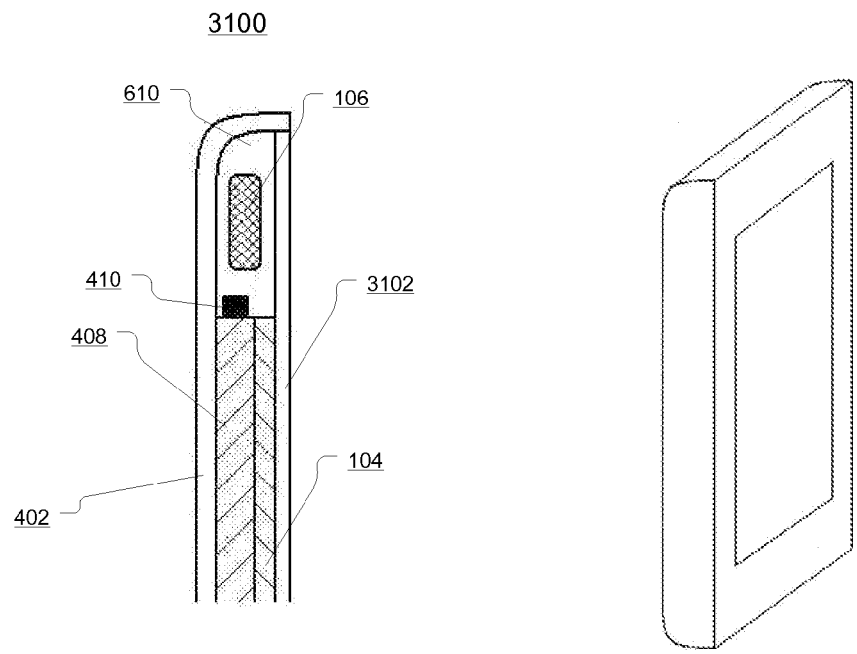
FIGS. 31A-31B illustrate exemplary portable computers consistent with the disclosed embodiments.
Figure 31B:
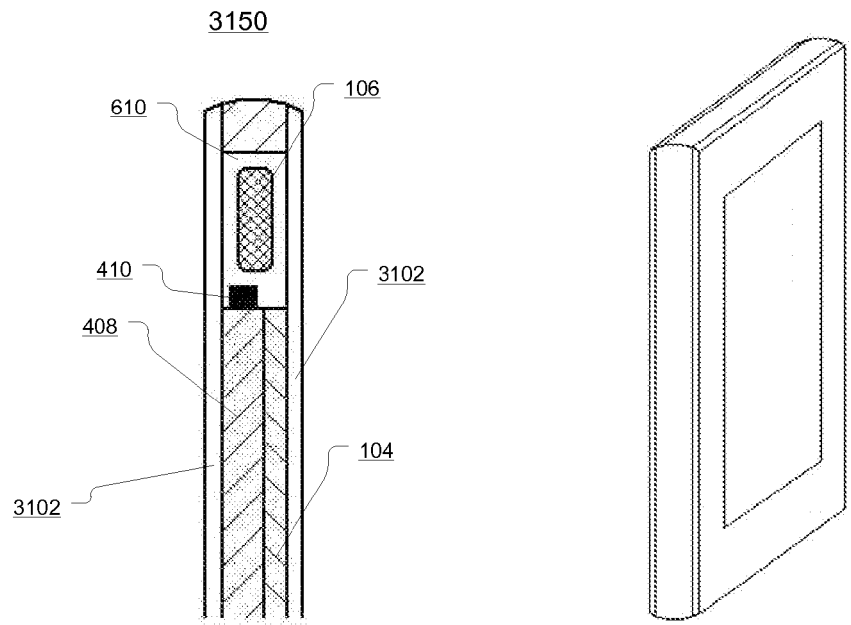

The integrated display systems may be used in various applications. For example, FIGS. 31A-31B show an exemplary portable computer or electronic book. As shown in FIG. 31A, portable computer 3100 may include light guide plate 408, LCD panel 104, control circuitry 106, light source 410, rear frame 402, and front film 3102. Front film 3102 may include any appropriate film for touch screen applications. In FIG. 31B, rear frame 402 is replaced by another front film 3102.

Figure 32:
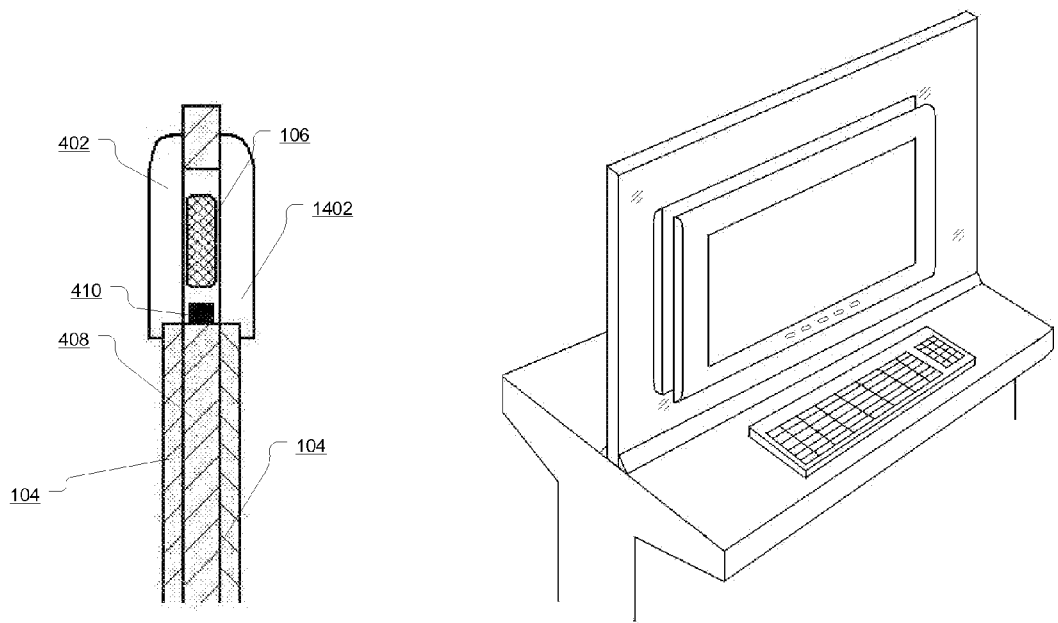
FIG. 32 illustrates an exemplary two-side display system consistent with the disclosed embodiments.
Figure 33:
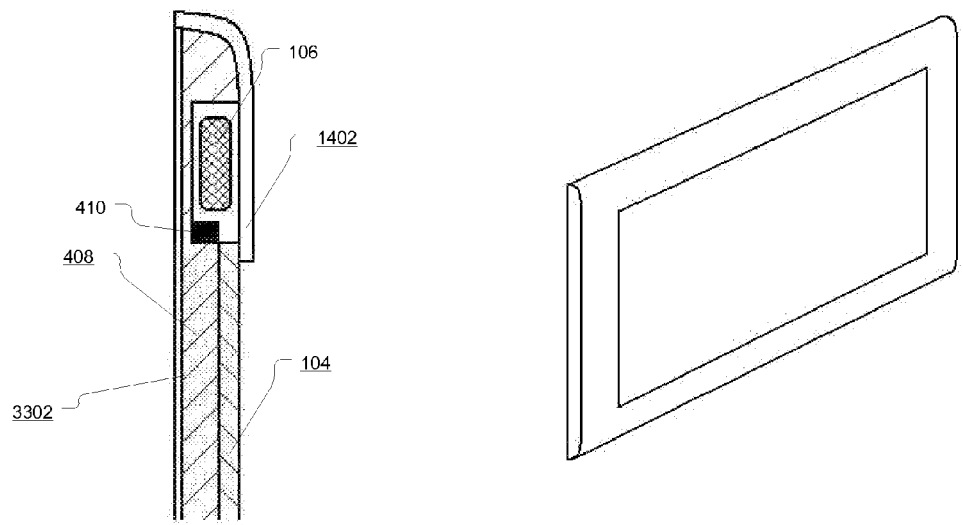
FIG. 33 illustrates an exemplary attachable display system consistent with the disclosed embodiments.

In FIG. 32, a two-side display system for computer room applications is illustrated. In FIG. 33, an attachable display system is illustrated. A thin film 3202 (e.g., reflective film, adhesive film) is used to cover the non-display side such that the display system can be attached to other structures.

Other embodiments of the disclosure will be apparent to those skilled in the art from consideration of the specification and practice of the disclosure herein. It is intended that the specification and examples be considered as exemplary only, with the scope being indicated by the following claims.

What is claimed is:
1. A liquid crystal display (LCD) system, comprising:
   a first light source;
   a self-contained display unit including at least a LCD panel and a light guide plate coupled together, wherein the light guide plate is configured to guide light from the first light source to the LCD panel as backlight and to structurally support the LCD panel;
a plurality of pre-made hollow spaces contained in the display unit configured to host components of the LCD system;
a controller contained in the plurality of pre-made hollow spaces and coupled to the LCD panel to control the LCD panel such that the light passing through the light guide plate is used as backlight for operation of the LCD panel; and
a self-contained backlight unit providing a second light source and coupled to the display unit, wherein the self-contained backlight unit provides the second light source to supplement the first light source and includes a plurality of light emitting diode (LED) belts configured to be retracted by a wheeling device when the first light source is sufficient for backlighting and to be deployed when the first light source is not sufficient for backlighting.

2. The LCD system according to claim 1, wherein:
the plurality of pre-made hollow spaces are made in the light guide plate in an area uncovered by the LCD panel.

3. The LCD system according to claim 1, wherein:
the self-contained display unit further includes a front frame coupled to the light guide plate using at least one of mechanical fastening means, compression forming means, splicing means, heat sealing means, ultrasonic welding means, molded casting means, and injection molding means.

4. The LCD system according to claim 3, wherein:
the plurality of pre-made hollow spaces are made in the light guide plate in an area uncovered by the LCD panel and covered by the front frame.

5. The LCD system according to claim 3, wherein:
the front frame is made of metal profiles.

6. The LCD system according to claim 1, wherein:
the first light source is natural light and the second light source is LED light.

7. The LCD system according to claim 1, wherein:
the light guide plate is coupled to a plurality of optic fibers to receive natural light from the first light source.

8. The LCD system according to claim 7, wherein:
the light guide plate is coupled to a plurality of LEDs in addition to the plurality of optic fibers to supplement the backlighting.

9. The LCD system according to claim 1, wherein:
a display unit includes a second LCD panel coupled to the light guide plate to form a two-side display.

10. The LCD system according to claim 1, wherein:
the light guide plate includes a film printed with a plurality of reflective convexes within the light guide plate such that a plurality of reflective pits are formed within the light guide plate.

11. A liquid crystal display (LCD) system based signaling system, comprising:
one or more LCD panels configured to receive natural light;
a plurality of convex lenses coupled to the LCD panels to concentrate the received natural light;
a plurality of optic fibers configured to receive the concentrated natural light at one end and to couple with a signaling panel at the other end such that the received light from the optic fiber is used to provide various signals on the signaling panel,
wherein the signaling panel is turned on and off by controlling the LCD panels to allow or not allow the natural light passing through the LCD panels.

12. The LCD system based signaling system according to claim 11, wherein:
the optic fibers are configured into a plurality of panel elements, and a brightness of the signaling panel is controlled by adjusting a size of areas of the panel elements.

13. The LCD system based signaling system according to claim 12, wherein:
the panel elements are in one of a circular shape, a circular strip shape, and a circular slice shape.

14. The LCD system based signaling system according to claim 12, wherein:
the panel elements include a plurality of light emitting diodes (LEDs) to supplement the natural light.

15. A liquid crystal display (LCD) system, comprising:
a display system without backlighting and capable of being coupled to a plurality of backlight sources; and a separate backlight system coupled to the display system to provide at least one of the plurality of backlight sources, wherein the display system includes at least a LCD panel, a light guide plate coupled to the LCD panel, and a control circuitry; the light guide plate is configured to guide light from the at least one of the plurality of backlight sources to the LCD panel as backlight and to structurally support the LCD panel; and the LCD panel is coupled to the light guide plate by a glue layer, wherein:
the glue layer is made of glue or a two-side glue film based on a substrate and is transparent or half-transparent,
the light guide plate is coupled to a plurality of LCD panels such that the LCD system supports a substantial large screen, and the control circuitry is installed on one or more sides of the light guide plate without covering the LCD panels.

16. The LCD system according to claim 15, wherein:
the control circuitry is fixed at the edge of the light guide plate using glue or resin.

17. The LCD system according to claim 15, wherein:
the control circuitry is glued to the edge of the light guide plate using the two-sided glue film, and covered by a thin film of plastic or metal.

18. The LCD system according to claim 15, wherein:
the display system and the backlight system are coupled via a rotating structure such that the backlight system is installed on a fixed base and the display system is selectively opened along the rotating structure.

* * * * *